US012397571B2

(12) United States Patent
Murayama et al.

(10) Patent No.: US 12,397,571 B2
(45) Date of Patent: Aug. 26, 2025

(54) LIQUID EJECTING SYSTEM

(71) Applicant: SEIKO EPSON CORPORATION, Tokyo (JP)

(72) Inventors: Toshiro Murayama, Fujimi-machi (JP); Takao Yamamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 18/325,852

(22) Filed: May 30, 2023

(65) Prior Publication Data

US 2023/0382141 A1 Nov. 30, 2023

(30) Foreign Application Priority Data

May 31, 2022 (JP) ................................ 2022-088364

(51) Int. Cl.
*B41J 29/38* (2006.01)

(52) U.S. Cl.
CPC .................................... *B41J 29/38* (2013.01)

(58) Field of Classification Search
CPC .... G06F 3/1285; G06F 3/1219; G06F 3/1273; G06F 3/1234
See application file for complete search history.

(56) References Cited

U.S. PATENT DOCUMENTS 11,593,044 B1 * 2/2023 McDaniel ............ G06F 3/1219
2003/0077097 A1 * 4/2003 Parry .................. G06F 3/1285 400/74
2021/0060939 A1 3/2021 Kanegae

FOREIGN PATENT DOCUMENTS

JP 2021-030689 A 3/2021

* cited by examiner

*Primary Examiner* — Lam S Nguyen
(74) *Attorney, Agent, or Firm* — WORKMAN NYDEGGER

(57) ABSTRACT

A liquid ejecting system includes a head unit that ejects liquid, a first output portion that outputs unique information unique to the head unit to an external server, a first input portion to which update information about the head unit is input from the external server in association with the unique information, and a notification portion that notifies a user based on the update information.

5 Claims, 21 Drawing Sheets

LIQUID EJECTING SYSTEM

The present application is based on, and claims priority from JP Application Serial Number 2022-088364, filed May 31, 2022, the disclosure of which is hereby incorporated by reference herein in its entirety.

BACKGROUND

1. Technical Field

The present disclosure relates to a liquid ejecting system.

2. Related Art

In a liquid ejecting apparatus such as an ink jet printer, generally, liquid such as ink is ejected from a liquid ejecting head by supplying a drive pulse to a drive element such as a piezoelectric element. For example, JP-A-2021-030689 discloses a liquid ejecting apparatus including a plurality of heads.

In recent years, there has been a business model in which a head manufacturer sells only a head to a printer manufacturer. Here, the head manufacturer may want to update the head in some way after shipping the head. For example, when some kind of defect is found for the first time after the head is shipped, there is a request to notify users of the printer sold by the printer manufacturer as soon as possible. Further, even when the program incorporated in the head is improved after the head is shipped, there is also a request that the users want to update the program as soon as possible. However, in the sales of the head, the printer manufacturer and the like intervenes between the head manufacturer and the user, and thus it is likely that the head manufacturer is not able to specify the user, and as a result, is unable to immediately inform the user about information on updates as described above.

SUMMARY

According to an aspect of the present disclosure, there is provided a liquid ejecting system including a head unit that ejects liquid, a first output portion that outputs unique information unique to the head unit to an external server, a first input portion to which update information about the head unit is input from the external server in association with the unique information, and a notification portion that notifies a user based on the update information.

DESCRIPTION OF EXEMPLARY EMBODIMENTS

Figure 1:
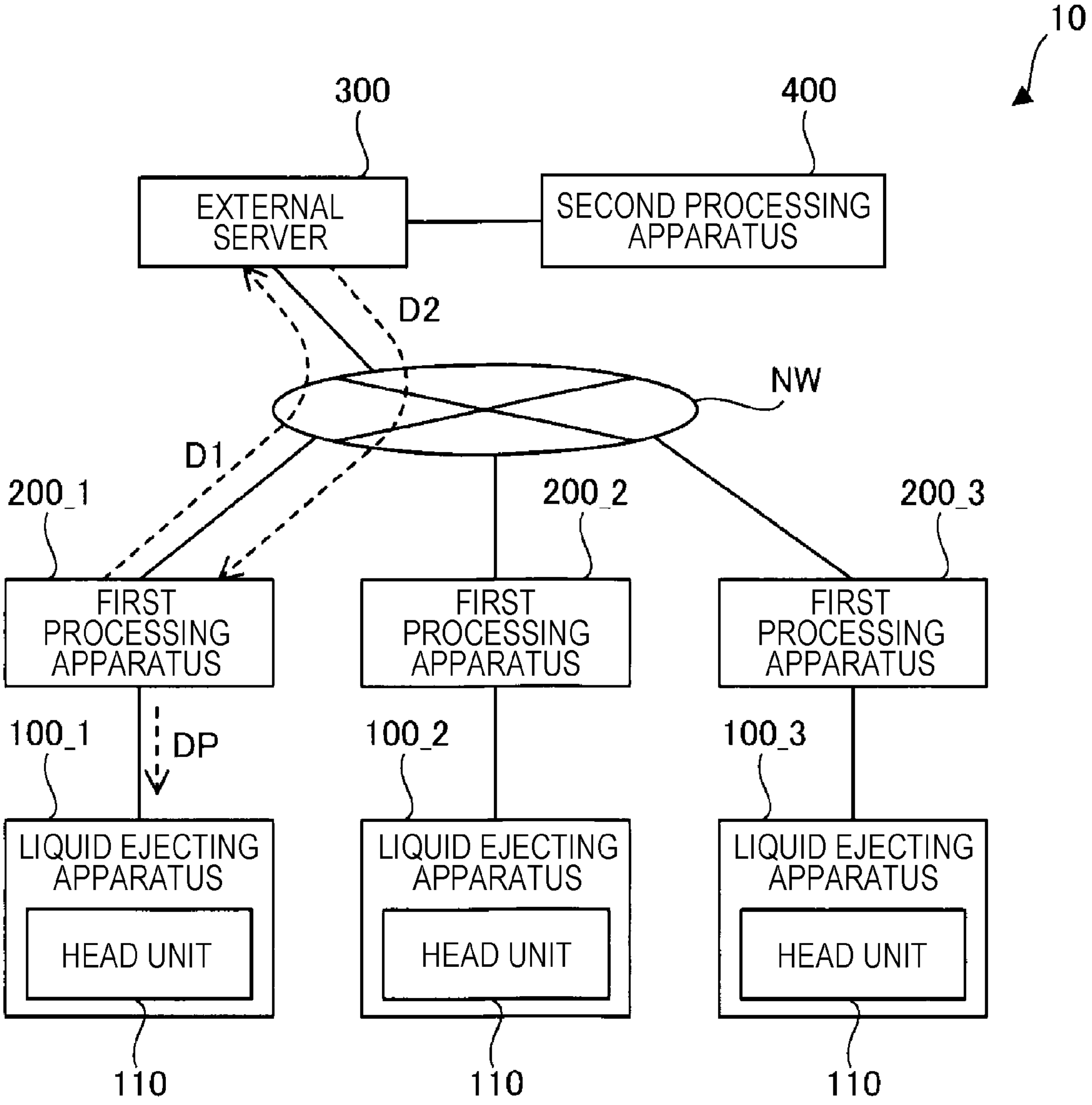
FIG. 1 is a schematic diagram showing a configuration example of a liquid ejecting system according to a first embodiment.

Hereinafter, preferred embodiments according to the present disclosure will be described with reference to the accompanying drawings. In the drawings, the dimensions and scale of each portion are appropriately different from the actual ones, and some portions are schematically shown for easy understanding. Further, the scope of the present disclosure is not limited to the embodiments unless it is stated in the following description that the present disclosure is particularly limited.

1. First Embodiment

1-1. Outline of Liquid Ejecting System

FIG. 1 is a schematic diagram showing a configuration example of a liquid ejecting system 10 according to a first embodiment. The liquid ejecting system 10 is a system that performs printing by an ink jet method. In the example shown in FIG. 1, the liquid ejecting system 10 includes liquid ejecting apparatuses 100_1 to 100_3, first processing apparatuses 200_1 to 200_3, an external server 300, and a second processing apparatus 400.

Here, each of the liquid ejecting apparatuses 100_1 to 100_3 is provided by a printer manufacturer that manufactures printer main bodies, which will be described later. The liquid ejecting apparatuses 100_1 to 100_3 may be provided by the same manufacturer or may be provided by different manufacturers. Each of first processing apparatuses 200_1 to 200_3 may use a property of a user or may be provided by a printer manufacturer. On the other hand, a head unit 110 incorporated in each of the liquid ejecting apparatuses 100_1 to 100_3 is provided by a head manufacturer that manufactures heads, which will be described later. The external server 300 may be any server as long as the head manufacturer can provide the necessary services to the user, and may be owned by the head manufacturer itself, or by a third party other than the head manufacturer. The second processing apparatus 400 is owned by the head manufacturer itself. The second processing apparatus 400 is maintained and managed by the head manufacturer.

For example, the user using the liquid ejecting apparatus 100_1 owns the liquid ejecting apparatus 100_1, the first processing apparatus 200_1, and the head unit 110. On the other hand, although the user does not own the external server 300, the first processing apparatus 200_1 owned by the user is communicably connected to the external server 300 through a communication network NW. When the external server 300 is owned by a third party, the second processing apparatus 400 is communicably connected to the external server 300 through the communication network NW (not shown).

For example, when a printer manufacturer for manufacturing a printer main body using a head purchased from the head manufacturer uses the printer main body manufactured by itself, the printer manufacturer is the user. Further, for example, when a printer manufacturer that manufactures a printer main body using a head purchased from the head manufacturer sells the printer main body to a third party and the third party uses the printer main body, the third party is the user.

The liquid ejecting apparatus 100_1 is communicably connected to the first processing apparatus 200_1. The liquid ejecting apparatus 100_2 is communicably connected to the first processing apparatus 200_2. The liquid ejecting apparatus 100_3 is communicably connected to the first processing apparatus 200_3. As described above, the liquid ejecting apparatuses 100_1 to 100_3 correspond to the first processing apparatuses 200_1 to 200_3, respectively, and are communicably connected to the first processing apparatuses 200_1 to 200_3. In the following, without distinguishing each of the liquid ejecting apparatuses 100_1 to 100_3 from the others, they may be referred to as the liquid ejecting apparatus 100. Without distinguishing each of the first processing apparatuses 200_1 to 200_3 from the others, they may be referred to as the first processing apparatus 200.

In the example shown in FIG. 1, the number of each of the liquid ejecting apparatus 100 and the first processing apparatus 200 included in the liquid ejecting system 10 is three, but the number is not limited thereto, and the number may be one, two, or four or more. That is, the number of sets of the liquid ejecting apparatus 100 and the first processing apparatus 200 is not limited to three, and may be one, two, or four or more.

The liquid ejecting apparatus 100 is a printer that prints an image based on recorded data DP from the first processing apparatus 200 on a print medium by an ink jet method. The recorded data DP is image data in a format that can be processed by the liquid ejecting apparatus 100. The print medium may be any medium as long as it can be printed by the liquid ejecting apparatus 100, and is not particularly limited, and is, for example, various papers, various cloths, various films, and the like. The liquid ejecting apparatus 100 may be a serial type printer or a line type printer.

The liquid ejecting apparatus 100 has a plurality of head units 110. The head units 110 are modules including an ink jet head. In the following, among the elements constituting the liquid ejecting apparatus 100, the elements other than the head unit 110 may be referred to as a "printer main body". Further, the head unit 110 or a liquid ejecting head 110*a* to be described later may be simply referred to as a "head". A configuration of the liquid ejecting apparatus 100 will be described in detail later with reference to FIGS. 2 and 3.

The first processing apparatus 200 is a desktop-type, a laptop-type computer, or the like, having a function as a management apparatus for managing the liquid ejecting apparatus 100. In addition to the function, the first processing apparatus 200 has a function of generating recorded data DP and a function of controlling printing by the liquid ejecting apparatus 100. A configuration of the first processing apparatus 200 will be described in detail later with reference to FIG. 4.

The first processing apparatus 200 is communicably connected to the external server 300 through the communication network NW including the Internet. The first processing apparatus 200 has a function of outputting unique information D1 to the external server 300, a function of inputting update information D2 from the external server 300, a function of performing notification based on the update information D2, and a function of displaying management information the liquid ejecting apparatus 100. The unique information D1 is information unique to the head unit 110 or the liquid ejecting head 110*a*, and is, for example, identification information indicating a unique number such as a serial number. The update information D2 is information on updating the head unit 110 or the liquid ejecting head 110*a*, and is, for example, information for notifying a deficiency, information for updating a program, such as firmware for ejecting ink, and the like. Further, the first processing apparatus 200 generates the recorded data DP by performing various processing, such as raster image processor (RIP) processing or color conversion processing, on image data in the file format such as PostScript, a portable document format (PDF), and an XML paper specification (XPS).

The external server 300 is a computer that functions as a cloud server, and has a function of inputting the unique information D1 from the first processing apparatus 200 and a function of outputting the update information D2 according to the unique information D1 to the first processing apparatus 200. A configuration of the external server 300 will be described in detail later with reference to FIG. 5.

Further, the external server 300 is communicably connected to the second processing apparatus 400, and appropriately transmits and receives information necessary for providing the update information D2 to the user. The second processing apparatus 400 is a computer that outputs, to the external server 300, information necessary for providing the update information D2 to the user.

In the liquid ejecting system 10 outlined above, the first processing apparatus 200 outputs the unique information D1 to the external server 300, and thus the external server 300 can generate the update information D2 based on the unique information D1. Then, the first processing apparatus 200 performs the notification based on the update information D2 input from the external server 300, and thus, the update information D2 is provided to the user. As described above, even when the printer manufacturer is different from the head manufacturer, the update information D2 about the head unit 110 can be promptly provided to the user. Hereinafter, the liquid ejecting system 10 will be described in detail.

1-2. Configuration of Liquid Ejecting Apparatus

Figure 2:
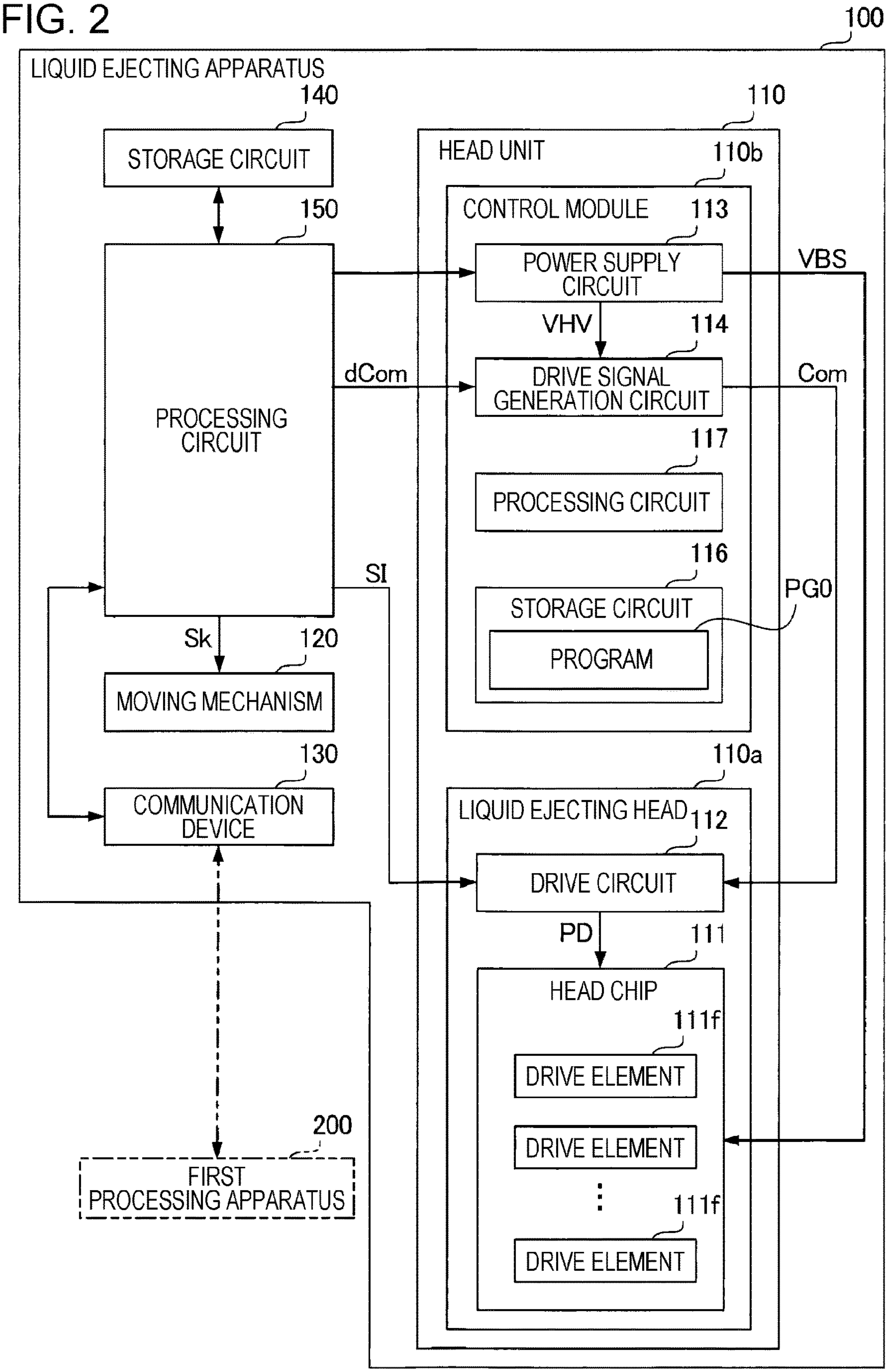
FIG. 2 is a schematic diagram showing a configuration example of a liquid ejecting apparatus used in the liquid ejecting system according to the first embodiment.

FIG. 2 is a schematic diagram showing a configuration example of the liquid ejecting apparatus 100 used in the liquid ejecting system 10 according to the first embodiment. As shown in FIG. 2, the liquid ejecting apparatus 100 includes a plurality of head units 110, a moving mechanism 120, a communication device 130, a storage circuit 140, and a processing circuit 150.

The head unit 110 is an assembly including a head chip 111, a drive circuit 112, a power supply circuit 113, a drive signal generation circuit 114, a storage circuit 116, and a processing circuit 117. The storage circuit 116 is an example of a "storage portion".

In the example shown in FIG. 2, the head unit 110 is divided into the liquid ejecting head 110*a* including the head chip 111 and the drive circuit 112, and a control module 110*b* including the power supply circuit 113, the drive signal generation circuit 114, the storage circuit 116, and the processing circuit 117. The head unit 110 is not limited to the aspect of being divided into the liquid ejecting head 110*a* and the control module 110*b*, and for example, a part or all of the control module 110*b* may be incorporated in the liquid ejecting head 110*a*.

In FIG. 2, one liquid ejecting head 110*a* is typically illustrated for convenience of drawing, but the head unit 110 has a plurality of liquid ejecting heads 110*a*. An example of arranging the plurality of liquid ejecting heads 110*a* will be described later with reference to FIGS. 7, 10, 12, and 14.

The head chip 111 ejects ink toward the print medium. In FIG. 2, among the components of the head chip 111, a plurality of drive elements 111*f* are typically shown. A detailed example of the head chip 111 will be described later with reference to FIG. 3.

In the example shown in FIG. 2, the head unit 110 has one head chip 111 in number, but the number may be two or more. When the liquid ejecting apparatus 100 is a serial type, one or more head chips 111 are arranged so that a plurality of nozzles are distributed over a part of the width direction of the print medium. Further, when the liquid ejecting apparatus 100 is a line type, two or more head chips 111 are arranged so that a plurality of nozzles are distributed over the entire width direction of the print medium.

The drive circuit 112 performs switching under the control of the processing circuit 150 as to whether or not to supply a drive signal Com output from the drive signal generation circuit 114 to each of the plurality of drive elements 111*f* of the head chip 111 as a drive pulse PD. The drive circuit 112 includes, for example, a group of switches such as a transmission gate for the switching.

The power supply circuit 113 receives electric power from a commercial power source (not shown) and generates various predetermined potentials. The various potentials generated are appropriately supplied to each portion of the liquid ejecting apparatus 100. In the example shown in FIG. 2, the power supply circuit 113 generates a power supply potential VHV and an offset potential VBS. The offset potential VBS is supplied to the head chip 111 and the like. Further, the power supply potential VHV is supplied to the drive signal generation circuit 114 and the like.

The drive signal generation circuit 114 is a circuit that generates a drive signal Com for driving each drive element 111*f* of the head chip 111. Specifically, the drive signal generation circuit 114 includes, for example, a digital-to-analog (DA) conversion circuit and an amplifier circuit. The drive signal generation circuit 114 generates the drive signal Com by the DA conversion circuit converting a waveform designation signal dCom from the processing circuit 150, which will be described later, from a digital signal to an analog signal, and the amplifier circuit amplifying the analog signal using the power supply potential VHV from the power supply circuit 113. Here, among the waveforms included in the drive signal Com, the signal of the waveform actually supplied to the drive element 111*f* is the drive pulse PD.

The storage circuit 116 is a device that stores various programs executed by the processing circuit 117 and various data processed by the processing circuit 117. The storage circuit 116 includes, for example, a semiconductor memory.

The storage circuit 116 stores a program PG0 for ejecting ink. The program PG0 is, for example, a program such as firmware that executes processing necessary for various operations of the control module 110*b* described above. The program PG0 may be provided in a storage circuit 140 or a storage circuit 240, which will be described later, instead of the storage circuit 116.

The processing circuit 117 is a device having a function of controlling each portion of a control module 110*c* and a function of processing various data. The processing circuit 117 has one or more processors such as, for example, a CPU. The processing circuit 117 may be integrally formed with the storage circuit 116, and may be constituted by hardware such as a DSP, an ASIC, a PLD, or an FPGA.

The processing circuit 117 controls each portion of the control module 110*c* by reading the program PG0 from the storage circuit 116 and executing the program PG0.

The moving mechanism 120 changes a relative position between the head unit 110 and the print medium. More specifically, when the liquid ejecting apparatus 100 is a serial type, the moving mechanism 120 includes a transport mechanism for transporting the print medium in a predetermined direction and a moving mechanism for repeatedly moving the head unit 110 along an axis orthogonal to the transport direction of the print medium. Further, when the liquid ejecting apparatus 100 is a line type, the moving mechanism 120 includes a transport mechanism for transporting the print medium in a direction intersecting a longitudinal direction of the elongated head unit 110.

The communication device 130 is a circuit capable of communicating with the first processing apparatus 200. For example, the communication device 130 is an interface such as a wireless or wired local area network (LAN) or a universal serial bus (USB). USB is a registered trademark. The communication device 130 may be connected to another first processing apparatus 200 through another network such as the Internet. Further, the communication device 130 may be integrated with the processing circuit 150.

The storage circuit 140 stores various programs executed by the processing circuit 150 and various data, such as the recorded data DP, processed by the processing circuit 150. The storage circuit 140 may include, for example, one or both semiconductor memories of one or more volatile memories such as random access memory (RAM) and one or more non-volatile memories such as read only memory (ROM), electrically erasable programmable read-only memory (EEPROM) or programmable ROM (PROM). The recorded data DP is supplied from, for example, the first processing apparatus 200. The storage circuit 140 may be built as a part of the processing circuit 150.

The processing circuit 150 has a function of controlling the operation of each portion of the liquid ejecting apparatus 100 and a function of processing various data. The processing circuit 150 includes, for example, one or more processors such as a central processing unit (CPU). The processing circuit 150 may include a programmable logic device such as a field-programmable gate array (FPGA) in place of the CPU or in addition to the CPU.

The processing circuit 150 controls the operation of each portion of the liquid ejecting apparatus 100 by executing a program stored in the storage circuit 140. Here, the processing circuit 150 generates signals such as a control signal Sk, a print data signal SI, and the waveform designation signal dCom as signals for controlling the operation of each portion of the liquid ejecting apparatus 100.

The control signal Sk is a signal for controlling the driving of the moving mechanism 120 and is input to the moving mechanism 120. The print data signal SI is a signal for controlling the drive of the drive circuit 112, and is input to the drive circuit 112. Specifically, the print data signal SI specifies whether the drive circuit 112 supplies the drive signal Com from the drive signal generation circuit 114 to the drive element 111*f* as a drive pulse PD, for each predetermined unit period. By the specifying, the amount of ink ejected from the head chip 111 and the like are specified. The waveform designation signal dCom is a digital signal for defining the waveform of the drive signal Com generated by the drive signal generation circuit 114, and is input to the drive signal generation circuit 114.

Figure 3:
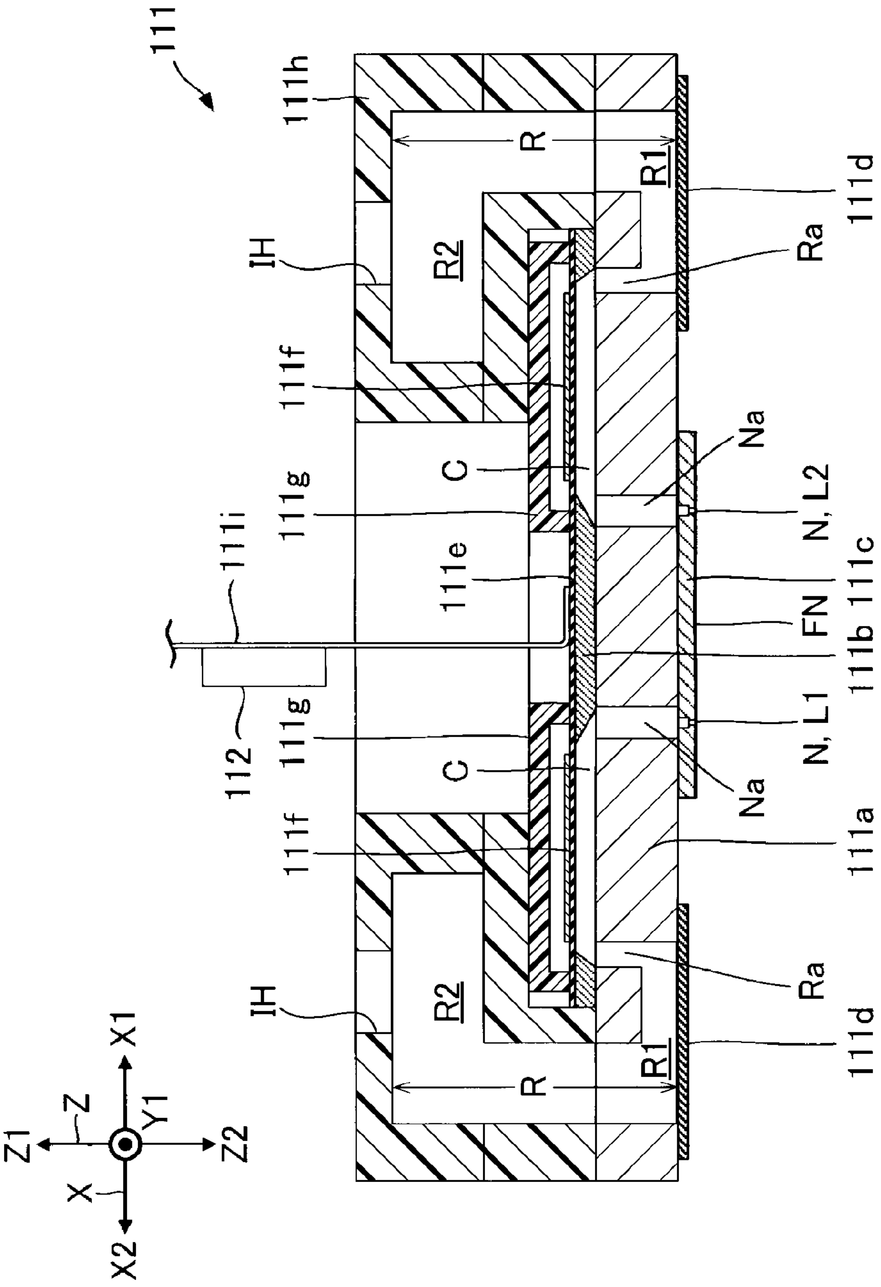
FIG. 3 is a cross-sectional view showing a configuration example of a head chip.

FIG. 3 is a cross-sectional view showing a configuration example of the head chip 111. In the following description, for convenience of description, an X axis, a Y axis and a Z axis that intersect each other are appropriately used. In the following, one direction along the X axis is an X1 direction, and a direction opposite to the X1 direction is an X2 direction. Similarly, the directions opposite to each other along the Y axis are a Y1 direction and a Y2 direction. Opposite directions along the Z axis are a Z1 direction and a Z2 direction. The configuration of the head chip 111 is an example and is not limited to the example shown in FIG. 3.

As shown in FIG. 3, the head chip 111 has a plurality of nozzles N arranged in a direction along the Y axis. The plurality of nozzles N are divided into a first column L1 and a second column L2 which are arranged at intervals in a direction along the X axis. Each of the first column L1 and the second column L2 is a set of a plurality of nozzles N linearly arranged in the direction along the Y axis.

The head chip 111 has a configuration substantially symmetrical with each other in the direction along the X axis. However, positions of the plurality of nozzles N in the first column L1 and the plurality of nozzles N in the second column L2 in the direction along the Y axis may match or differ from each other. FIG. 3 illustrates a configuration in which the positions of the plurality of nozzles N in the first column L1 and the plurality of nozzles N in the second column L2 in the direction along the Y axis match with each other.

As shown in FIG. 3, the head chip 111 includes a flow path substrates 111*a*, a pressure chamber substrate 111*b*, a nozzle plate 111*c*, vibration absorbing bodies 111*d*, a vibration plate 111*e*, a plurality of drive elements 111*f*, protective plates 111*g*, a case 111*h*, and a wiring substrate 111*i*.

The flow path substrate 111*a* and the pressure chamber substrate 111*b* are stacked in this order in the Z1 direction, and form a flow path for supplying ink to a plurality of nozzles N. The vibration plate 111*e*, the plurality of drive elements 111*f*, the protective plates 111*g*, the case 111*h*, and the wiring substrate 111*i* are installed in a region positioned in the Z1 direction with respect to the stack body formed by the flow path substrate 111*a* and the pressure chamber substrate 111*b*. On the other hand, the nozzle plate 111*c* and the vibration absorbing bodies 111*d* are installed in a region positioned in the Z2 direction with respect to the stack body. Each element of the head chip 111 is schematically a plate-shaped member elongated in the Y direction, and is joined to each other by, for example, an adhesive. Hereinafter, each element of the head chip 111 will be described in order.

The nozzle plate 111*c* is a plate-shaped member provided with a plurality of nozzles N in each of the first column L1 and the second column L2. Each of the plurality of nozzles N is a through hole through which ink is passed. Here, the surface of the nozzle plate 111*c* facing the Z2 direction is a nozzle surface FN. The nozzle plate 111*c* is manufactured by processing a silicon single crystal substrate by a semiconductor manufacturing technique using a processing technique such as dry etching or wet etching, for example. However, other known methods and materials may be appropriately used for manufacturing the nozzle plate 111*c*. Further, the cross-sectional shape of the nozzle is typically a circular shape, but the shape is not limited thereto, and may be a non-circular shape such as a polygon or an ellipse.

The flow path substrate 111*a* is provided with a space R1, a plurality of supply flow paths Ra, and a plurality of communication flow paths Na for each of the first column L1 and the second column L2. The space R1 is an elongated opening extending in the direction along the Y axis in a plan view in the direction along the Z axis. Each of the supply flow path Ra and the communication flow path Na is a through hole formed for each nozzle N. Each supply flow path Ra communicates with the space R1.

The pressure chamber substrate 111*b* is a plate-shaped member provided with a plurality of pressure chambers C referred to as cavities for each of the first column L1 and the second column L2. The plurality of pressure chambers C are arranged in the direction along the Y axis. Each pressure chamber C is an elongated space formed for each nozzle N and extending in the direction along the X axis in a plan view. Each of the flow path substrate 111*a* and the pressure chamber substrate 111*b* is manufactured by processing a silicon single crystal substrate by, for example, semiconductor manufacturing technique, in the same manner as the nozzle plate 111*c* described above. However, other known methods and materials may be appropriately used for the manufacturing of each of the flow path substrate 111*a* and the pressure chamber substrate 111*b*.

The pressure chamber C is a space positioned between the flow path substrate 111*a* and the vibration plate 111*e*. For each of the first column L1 and the second column L2, a plurality of the pressure chambers C are arranged in a direction along the Y axis. Further, the pressure chamber C communicates with each of the communication flow path Na and the supply flow path Ra. Therefore, the pressure chamber C communicates with the nozzle N through the communication flow path Na and communicates with the space R1 through the supply flow path Ra.

The vibration plate 111*e* is arranged on the surface of the pressure chamber substrate 111*b* facing the Z1 direction. The vibration plate 111*e* is a plate-shaped member that can elastically vibrate. The vibration plate 111*e* has, for example, a first layer and a second layer, which are stacked in the Z1 direction in this order. The first layer is, for example, an elastic film made of silicon oxide ($SiO_2$). The elastic film is formed, for example, by thermally oxidizing one surface of a silicon single crystal substrate. The second layer is, for example, an insulating film made of zirconium oxide ($ZrO_2$). The insulating film is formed by, for example, forming a zirconium layer by a sputtering method and thermally oxidizing the layer. The vibration plate 111*e* is not limited to the above-mentioned stacked configuration of the first layer and the second layer, and may be constituted by, for example, a single layer or three or more layers.

On the surface of the vibration plate 111*e* facing the Z1 direction, a plurality of drive elements 111*f* corresponding to the nozzles N are arranged for each of the first column L1 and the second column L2. Each drive element 111*f* is a passive element that is deformed by the supply of the drive signal. Each drive element 111*f* has an elongated shape extending in the direction along the X axis in a plan view. The plurality of drive elements 111*f* are arranged in the direction along the Y axis to correspond to the plurality of pressure chambers C. The drive element 111*f* overlaps the pressure chamber C in a plan view.

Each drive element 111*f* is a piezoelectric element, and although not shown, it has a first electrode, a piezoelectric layer, and a second electrode, which are stacked in the Z1 direction in this order. One of the first electrode and the second electrode is an individual electrode arranged apart from the other for each drive element 111*f*, and the drive pulse PD is supplied to the one electrode. The other electrode of the first electrode and the second electrode is a band-shaped common electrode extending in the direction along the Y axis to be continuous over the plurality of drive elements 111*f*, and the offset potential VBS is supplied to the other electrode. Examples of the metal material of the electrodes include metal materials such as platinum (Pt), aluminum (Al), nickel (Ni), gold (Au), and copper (Cu), and of the materials, one type can be used alone or two or more types can be used in combination in an alloyed or stacked manner. The piezoelectric layer is made of a piezoelectric material such as lead zirconate titanate ($Pb(Zr, Ti) O_3$), and has, for example, a band shape extending in the direction along the Y axis to be continuous over the plurality of drive elements 111*f*. However, the piezoelectric layer may be integrated over the plurality of drive elements 111*f*. In this case, the piezoelectric layer is provided with a through hole penetrating the piezoelectric layer extending in the direction along the X axis in a region corresponding to the gap between the pressure chambers C adjacent to each other in a plan view. When the vibration plate 111*e* vibrates in conjunction with the above deformation of the drive elements 111*f*, the pressures in the pressure chambers C fluctuate, and ink is ejected from the nozzles N.

The protective plates 111*g* are a plate-shaped members installed on the surface of the vibration plate 111*e* facing the Z1 direction, and protect the plurality of drive elements 111*f* and reinforce the mechanical strength of the vibration plate 111*e*. Here, the plurality of drive elements 111*f* are accommodated between the protective plates 111*g* and the vibration plate 111*e*. The protective plates 111*g* are made of, for example, a resin material.

The case 111*h* is a member for storing ink supplied to a plurality of pressure chambers C. The case 111*h* is made of, for example, a resin material. The case 111*h* is provided with a space R2 for each of the first column L1 and the second column L2. The space R2 is a space communicating with the above-mentioned space R1 and functions as a reservoir R for storing ink supplied to a plurality of pressure chambers C together with the space R1. The case 111*h* is provided with an introduction port IH for supplying ink to each reservoir R. The ink in each reservoir R is supplied to the pressure chamber C through each supply flow path Ra.

The vibration absorbing body 111*d*, also referred to as a compliance substrate, is a flexible resin film constituting a wall surface of the reservoir R, and absorbs pressure fluctuations of ink in the reservoir R. The vibration absorbing body 111*d* may be a thin plate made of metal and having flexibility. The surface of the vibration absorbing body 111*d* facing the Z1 direction is joined to the flow path substrate 111*a* with an adhesive or the like.

The wiring substrate 111*i* is mounted on the surface of the vibration plate 111*e* facing the Z1 direction, and is a mounting component for electrically coupling the head chip 111, the drive circuit 112, the control module 110*b*, and the like. The wiring substrate 111*i* is a flexible wiring substrate such as a chip on film (COF), a flexible printed circuit (FPC) or a flexible flat cable (FFC). The drive circuit 112 described above is mounted on the wiring substrate 111*i* of the present embodiment.

1-3. Configuration of First Processing Apparatus

Figure 4:
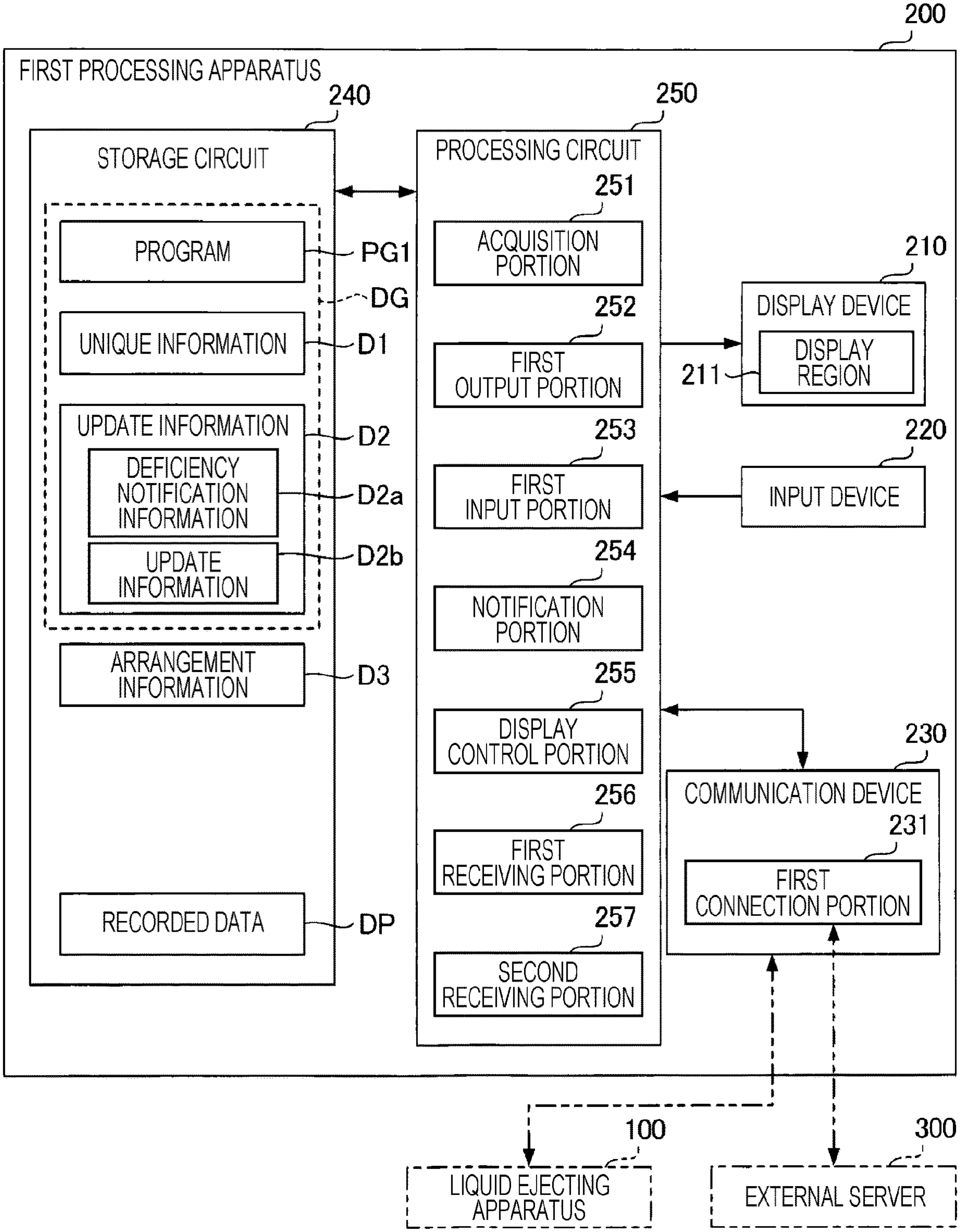
FIG. 4 is a schematic diagram showing a configuration example of a first processing apparatus used in the liquid ejecting system according to the first embodiment.

FIG. 4 is a schematic diagram showing a configuration example of the first processing apparatus 200 used in the liquid ejecting system 10 according to the first embodiment. As shown in FIG. 4, the first processing apparatus 200 includes a display device 210, an input device 220, a communication device 230, a storage circuit 240, and a processing circuit 250. The components are communicably connected to each other.

The display device 210 displays various images under the control of the processing circuit 250. Here, the display device 210 includes a display region 211 constituted by a display panel such as a liquid crystal display panel or an organic electro-luminescence (EL) display panel. The display device 210 may be provided outside the first processing apparatus 200. Further, the display device 210 may be a component of the liquid ejecting apparatus 100.

The input device 220 is a device that receives operations from the user. For example, the input device 220 has a pointing device such as a touch pad, a touch panel or a mouse. Here, when the input device 220 has a touch panel, the input device 220 may also serve as a display device 210. The input device 220 may be provided outside the first processing apparatus 200. Further, the input device 220 may be a component of the liquid ejecting apparatus 100. Further, the input device 220 may include an image capturing device having a charge coupled device (CCD) image sensor, a complementary MOS (CMOS) image sensor, or the like.

The communication device 230 is a circuit capable of communicating with each of the liquid ejecting apparatus 100 and the external server 300. For example, the communication device 230 is an interface such as a wireless or wired LAN or USB. The communication device 230 transmits the recorded data DP to the liquid ejecting apparatus 100 by communicating with the liquid ejecting apparatus 100. Further, the communication device 230 transmits the unique information D1 and receives the update information D2 by communicating with the external server 300. That is, the communication device 230 functions as a first connection portion 231 that is communicably connected to the external server 300. The communication device 230 may be integrated with the processing circuit 250.

The storage circuit 240 is a device that stores various programs executed by the processing circuit 250 and various data processed by the processing circuit 250. The storage circuit 240 has, for example, a hard disk drive or a semiconductor memory. A part or all of the storage circuit 240 may be provided in a storage device or a server outside the first processing apparatus 200.

The storage circuit 240 of the present embodiment stores a program PG1, the unique information D1, the update information D2, arrangement information D3, and the recorded data DP. Some or all of the program PG1, the unique information D1, the update information D2, and the arrangement information D3 may be stored in a storage device or server outside the first processing apparatus 200. Further, in the following, the program PG1, the unique information D1, and the update information D2 may be collectively referred to as information DG.

The program PG1 is a management program for managing the liquid ejecting apparatus 100, and causes a computer to implement various functions required for the management.

The unique information D1 is information unique to the head unit 110. More specifically, the unique information D1 may be any information that can identify the type of the head unit 110, and examples thereof may include identification information indicating a unique number such as a serial number unique to the head unit 110 or the liquid ejecting head 110*a*.

In addition, other information about the head unit 110 may be added to the unique information D1. Examples of the other information include information regarding the type of liquid used for ejection in the head unit 110, information regarding the temperature of the head unit 110, and the like. The Information regarding the type of liquid used for ejection in the head unit 110 includes, for example, information regarding a product number, viscosity, residual vibration, ejection speed, and the like, of the ink. Examples of the information regarding the temperature of the head unit 110 include information regarding the detection temperature of a temperature sensor provided around the head unit 110.

The update information D2 is information related to the update of the head unit 110. As described above, the update information D2 is provided from the external server 300 to the first processing apparatus 200. In the example shown in FIG. 4, the update information D2 includes deficiency notification information D2*a* and update information D2*b*.

The deficiency notification information D2*a* is information for notifying the user of the deficiency of the head unit 110. More specifically, the deficiency notification information D2*a* is, for example, information indicating the existence of a defect or the like discovered after manufacturing in the head unit 110 having a specific serial number (ID).

The update information D2*b* is information such as a program for updating the program PG0 of the head unit 110 described above.

The arrangement information D3 is information regarding arrangement of a plurality of liquid ejecting heads 110*a*. More specifically, the arrangement information D3 is, for example, information indicating arrangement of a plurality of liquid ejecting heads 110*a* for each ink color.

The processing circuit 250 is a device having a function of controlling each portion of the first processing apparatus 200 and a function of processing various data. The processing circuit 250 has, for example, a processor such as a central processing unit (CPU). The processing circuit 250 may be constituted by a single processor or may be constituted by a plurality of processors. In addition, some or all of the functions of the processing circuit 250 are implemented by hardware such as a digital signal processor (DSP), an application specific integrated circuit (ASIC), a programmable logic device (PLD), a field programmable gate array (FPGA).

The processing circuit 250 functions as an acquisition portion 251, a first output portion 252, a first input portion 253, a notification portion 254, a display control portion 255, a first receiving portion 256, and a second receiving portion 257 by reading the program PG1 from the storage circuit 240 and executing the program PG1.

The acquisition portion 251 acquires the unique information D1. In the present embodiment, the acquisition portion 251 acquires the unique information D1 based on a reception result in the first receiving portion 256. When the storage circuit 116 of the head unit 110 stores identification information indicating a unique number such as a serial number, the acquisition portion 251 may acquire the unique information D1 by reading the identification information.

The first output portion 252 outputs the unique information D1 through the first connection portion 231. For example, the first output portion 252 outputs the unique information D1 to the external server 300 through the first connection portion 231, by using an instruction or the like issued by a user using the input device 220 as a trigger. The first output portion 252 may output other information such as the arrangement information D3 together with the unique information D1 to the external server 300.

The update information D2 is input to the first input portion 253 through the first connection portion 231. For example, the update information D2 is input from the external server 300 to the first input portion 253 through the first connection portion 231, by using an instruction or the like issued by the user using the input device 220 as a trigger.

The notification portion 254 notifies the user based on the update information D2. In the present embodiment, the notification portion 254 makes the notification by using the display device 210. More specifically, the notification portion 254 causes the display device 210 to display information for the notification in the display region 211. A specific example of the notification will be described later with reference to FIG. 9.

The display control portion 255 displays the arrangement image GA showing the arrangement of the plurality of liquid ejecting heads 110*a* in the display region 211. In the present embodiment, the display control portion 255 displays the arrangement image GA in the display region 211 based on the arrangement information D3. In addition, the display control portion 255 displays an appropriate image such as an error image B2 in the display region 211 based on a reception result of the first receiving portion 256. A specific example of the arrangement image GA will be described later with reference to FIGS. 7, 8, and 10 to 15.

The first receiving portion 256 receives, from the user, an operation on the arrangement image GA. Based on the result of the receiving, the display control portion 255 performs display control of the display region 211. The second receiving portion 257 receives an input from the user regarding the arrangement information D3. The arrangement information D3 is generated based on the result of the receiving. Details of the receiving portion will be described later with reference to FIG. 8.

1-4. Configuration of Server

Figure 5:
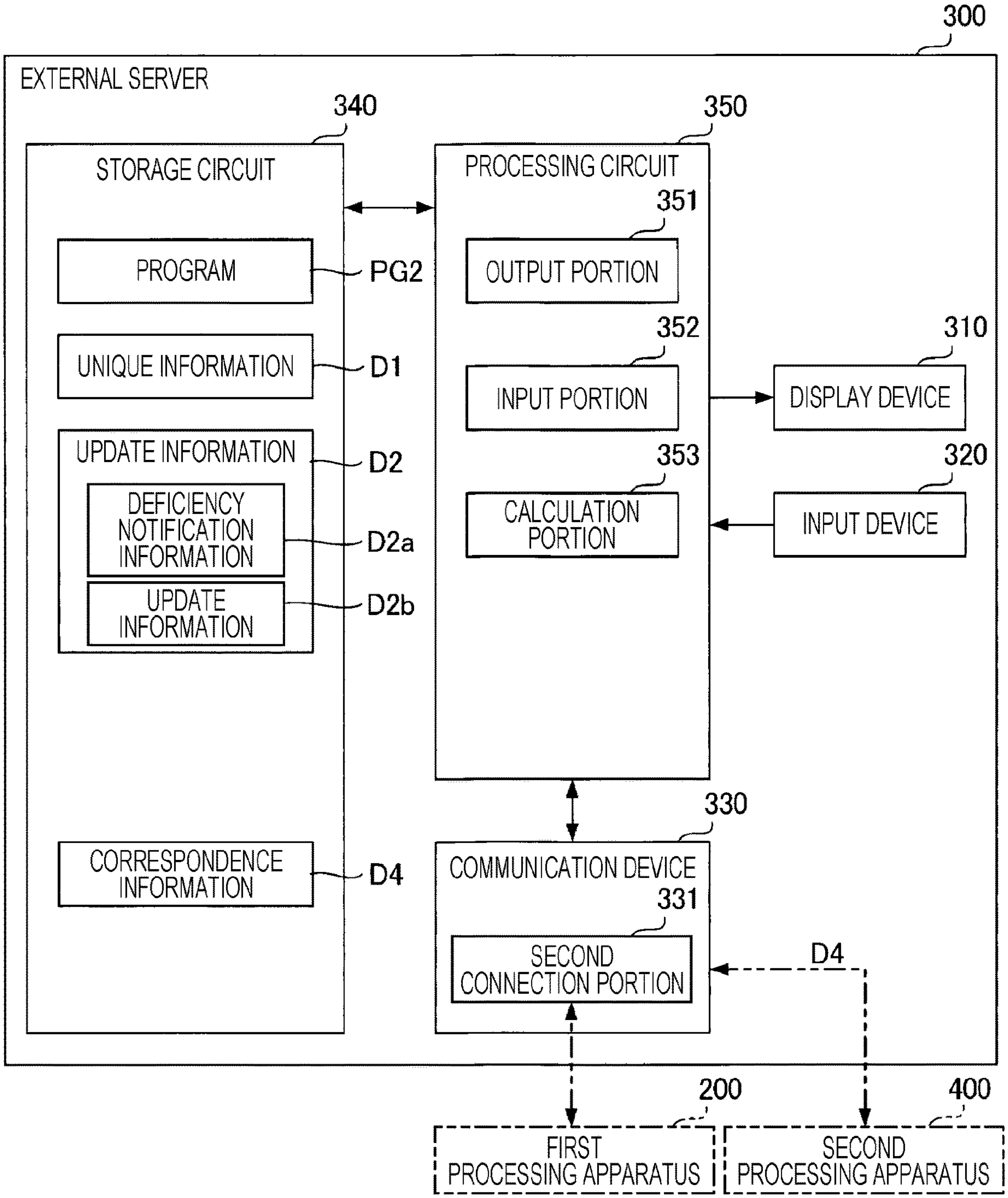
FIG. 5 is a schematic diagram showing a configuration example of an external server used in the liquid ejecting system according to the first embodiment.

FIG. 5 is a schematic diagram showing a configuration example of the external server 300 used in the liquid ejecting system 10 according to the first embodiment. As shown in FIG. 5, the external server 300 includes a display device 310, an input device 320, a communication device 330, a storage circuit 340, and a processing circuit 350. The components are communicably connected to each other.

The display device 310 is a device that displays various images under the control of the processing circuit 350, and is configured in the same manner as the display device 210 described above. The input device 320 is a device that receives an operation from the user, and is configured in the same manner as the input device 220 described above. The communication device 330 is a circuit capable of communicating with each first processing apparatus 200, and is configured in the same manner as the communication device 230 as described above. The communication device 330 may be integrated with the processing circuit 350.

Here, the communication device 330 receives the unique information D1 and transmits the update information D2 by communicating with the first processing apparatus 200. That is, the communication device 330 functions as a second connection portion 331 that is communicably connected to the first connection portion 231. In addition, the communication device 330 transmits the unique information D1 by communicating with the second processing apparatus 400, as needed.

The storage circuit 340 is a device that stores various programs executed by the processing circuit 350 and various data processed by the processing circuit 350, and is configured in the same manner as the storage circuit 240 described above. The storage circuit 340 stores a program PG2, the unique information D1, the update information D2, and correspondence information D4. When the first processing apparatus 200 transmits the arrangement information D3 together with the unique information D1, the arrangement information D3 is also stored in the storage circuit 340.

The program PG2 is a program that enables a computer to implement various functions necessary for generating the update information D2 according to the unique information D1. The correspondence information D4 is information regarding a correspondence relationship between the unique information D1 and the update information D2. For the correspondence information D4, any format is possible without being limited to a particular format; for example, the format is a lookup table showing the correspondence relationship between the unique information D1 and the update information D2. Further, the "generation of the update information D2" includes a case where one or more pieces of update information D2 are selected or extracted from a plurality of pieces of update information D2.

For example, after the head manufacturer manufactures and ships the head unit 110, in some cases, some deficiency may be found in the head unit 110 or the program PG0 mounted on the head unit 110 may be updated. In this case, the head manufacturer wants to notify the users of the information related to update, such as the deficiency notification or updates, but when the printer manufacturer is involved in the sale, the head manufacturer may not be able to specify the users. Therefore, the head manufacturer stores, in the external server 300, the correspondence relationship in which the update information D2 and the unique information D1 about the head unit corresponding to the update information D2 are associated with the external server 300, as the correspondence information D4. Then, when the unique information D1 is input to the external server 300 from the first processing apparatus 200 on the user side, the external server 300 determines whether or not the unique information D1 is included in the correspondence information D4. When the unique information D1 is included in the correspondence information D4, the external server 300 outputs the update information D2 corresponding to the unique information D1 to the first processing apparatus 200 in the correspondence information D4. In this way, even if the user cannot be specified on the head manufacturer side, the user can be notified of the update information D2 according to the unique information D1.

The processing circuit 350 is a device having a function of controlling each portion of the external server 300 and a function of processing various data, and is configured in the same manner as the processing circuit 250 described above. The processing circuit 350 functions as an output portion 351, an input portion 352, and a calculation portion 353 by reading the program PG2 from the storage circuit 340 and executing the program PG2.

The output portion 351 outputs the update information D2 through the second connection portion 331. For example, the output portion 351 outputs the update information D2 to the first processing apparatus 200 through the second connection portion 331, by using an instruction or the like issued by the user using the input device 220 as a trigger.

The unique information D1 is input to the input portion 352 through the second connection portion 331. For example, the unique information D1 is input from the first processing apparatus 200 to the input portion 352 through the second connection portion 331, by using an instruction or the like by the user using the input device 220 as a trigger.

The calculation portion 353 performs a calculation to generate the update information D2 according to the unique information D1. In the present embodiment, the calculation portion 353 performs a calculation to generate the update information D2 using the unique information D1 and the correspondence information D4.

1-5. Process of Liquid Ejecting System

Figure 6:
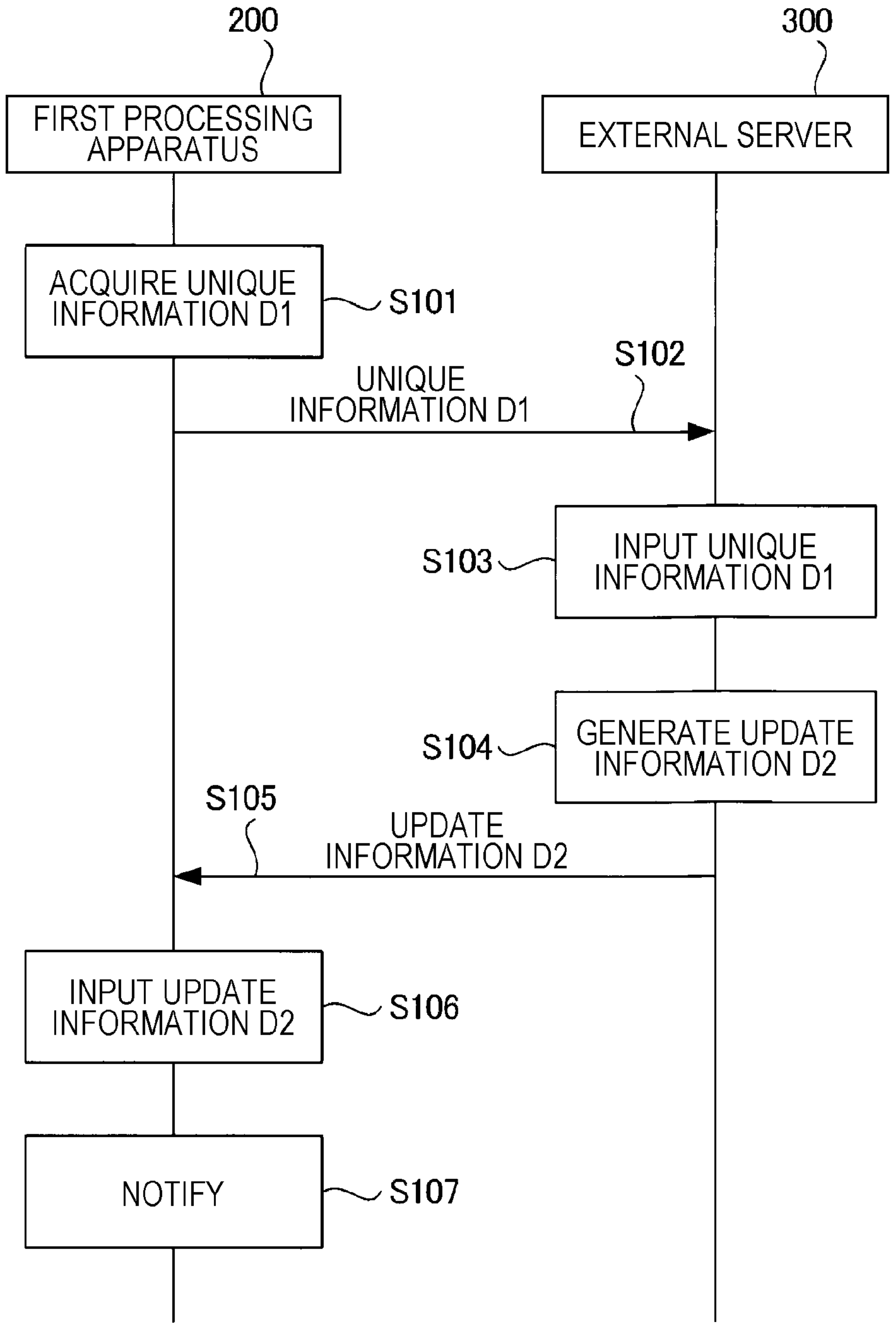
FIG. 6 is a flowchart showing a process of the liquid ejecting system according to the first embodiment.

FIG. 6 is a flowchart showing a process of the liquid ejecting system 10 according to the first embodiment. In the liquid ejecting system 10, first, as shown in FIG. 6, in step S101, the first processing apparatus 200 acquires the unique information D1. This acquisition is performed by the above-mentioned acquisition portion 251. Here, the acquisition portion 251 causes the display device 210 to display an input image GD, which will be described later, as an image for a graphical user interface (GUI) for inputting information required for acquiring the unique information D1. The first receiving portion 256 receives an operation on the input image GD from the user. The acquisition portion 251 acquires the unique information D1 based on the result of the receiving by the first receiving portion 256.

Then, in step S102, the first processing apparatus 200 outputs the unique information D1 to the external server 300.

Specifically, in step S102, the first output portion 252 outputs the unique information D1 through the first connection portion 231 by using the acquisition of the unique information D1 as a trigger. A timing at which the unique information D1 is output to the first connection portion 231 is not limited to the time when the unique information D1 is acquired. For example, the first output portion 252 may transmit authentication information such as account information and a password for the user to the external server 300 when the first receiving portion 256 receives the input using an input image GD for the GUI to be described later, the external server 300 may transmit output permission information to the first processing apparatus 200 when the external server 300 succeeds in the authentication using the authentication information, and the first output portion 252 may output the unique information D1 to the external server 300 when the output permission information is received by the first processing apparatus 200.

Next, in step S103, the external server 300 inputs the unique information D1. The input is performed by the input portion 352. Then, in step S104, the external server 300 generates the update information D2 based on the unique information D1. The generation is performed by the calculation portion 353. The external server 300 may compare the unique information D1 with predetermined comparison information, and may cancel the processing after step S104 depending on the comparison result. In this case, the output portion 351 may output information indicating that the update information D2 is not provided.

Then, in step S105, the external server 300 outputs the update information D2 to the first processing apparatus 200. The output is performed by the output portion 351.

Next, in step S106, the first processing apparatus 200 inputs the update information D2. Specifically, in step S106, the update information D2 from the external server 300 is input to the first input portion 253 through the first connection portion 231. The first input portion 253 may notify the user as to whether or not the update information D2 is input from the external server 300 by using the display device 210 or the like, and the update information D2 from the external server 300 may be input only when the user inputs an instruction to permit an input by the input device 220 or the like.

Then, in step S107, the first processing apparatus 200 makes a notification based on the update information D2. The notification is performed by the notification portion 254. Specifically, the notification portion 254 displays a region RC3 based on the update information D2 in the display region 211.

1-6. Display in Display Region

When the above-described program PG1 is executed by the first processing apparatus 200, various information required to manage the liquid ejecting apparatus 100 is displayed in the display region 211 of the display device 210. Hereinafter, the display in the display region 211 will be described by taking Arrangement Examples 1 to 4 of the plurality of liquid ejecting heads 110*a* as examples. It should be noted that Arrangement Examples 1 to 4 are examples for convenience in describing the arrangement of the plurality of liquid ejecting heads 110*a*, and the present disclosure is not limited thereto.

Arrangement Example 1

Figure 7:
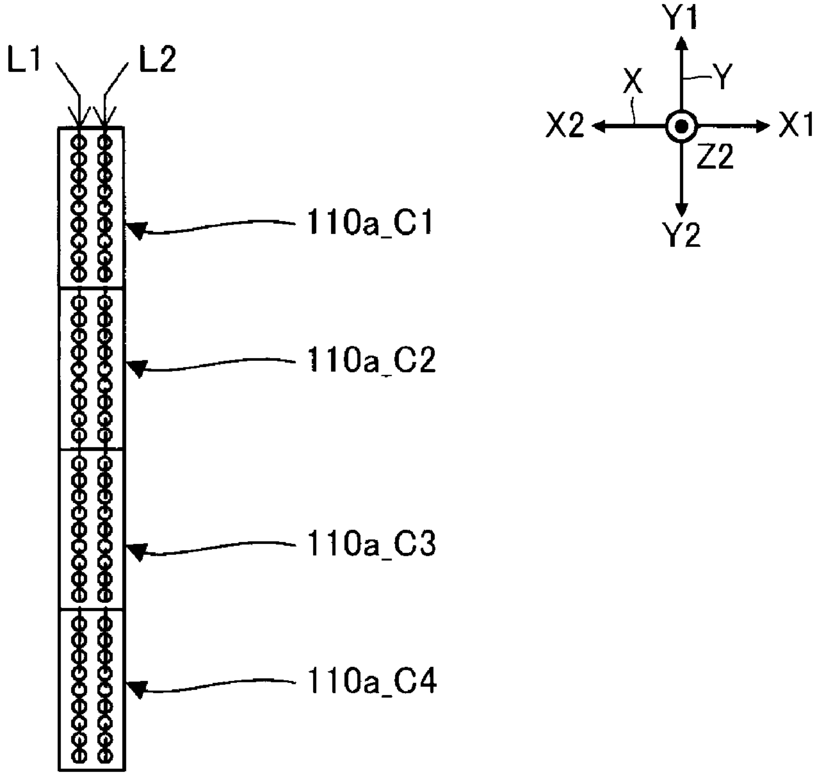
FIG. 7 is a diagram showing Arrangement Example 1 of a plurality of liquid ejecting heads.

FIG. 7 is a diagram showing Arrangement Example 1 of the plurality of liquid ejecting heads 110*a*. In FIG. 7, an arrangement of four liquid ejecting heads 110*a*_C1, 110*a*_C2, 110*a*_C3, and 110*a*_C4 is shown as Arrangement Example 1. Each of the liquid ejecting heads 110*a*_C1, 110*a*_C2, 110*a*_C3, and 110*a*_C4 is the liquid ejecting head 110*a* that ejects cyan ink.

In Arrangement Example 1, as shown in FIG. 7, the liquid ejecting heads 110*a*_C1, 110*a*_C2, 110*a*_C3, and 110*a*_C4 are arranged along the same straight line in the Y2 direction in this order.

Figure 8:
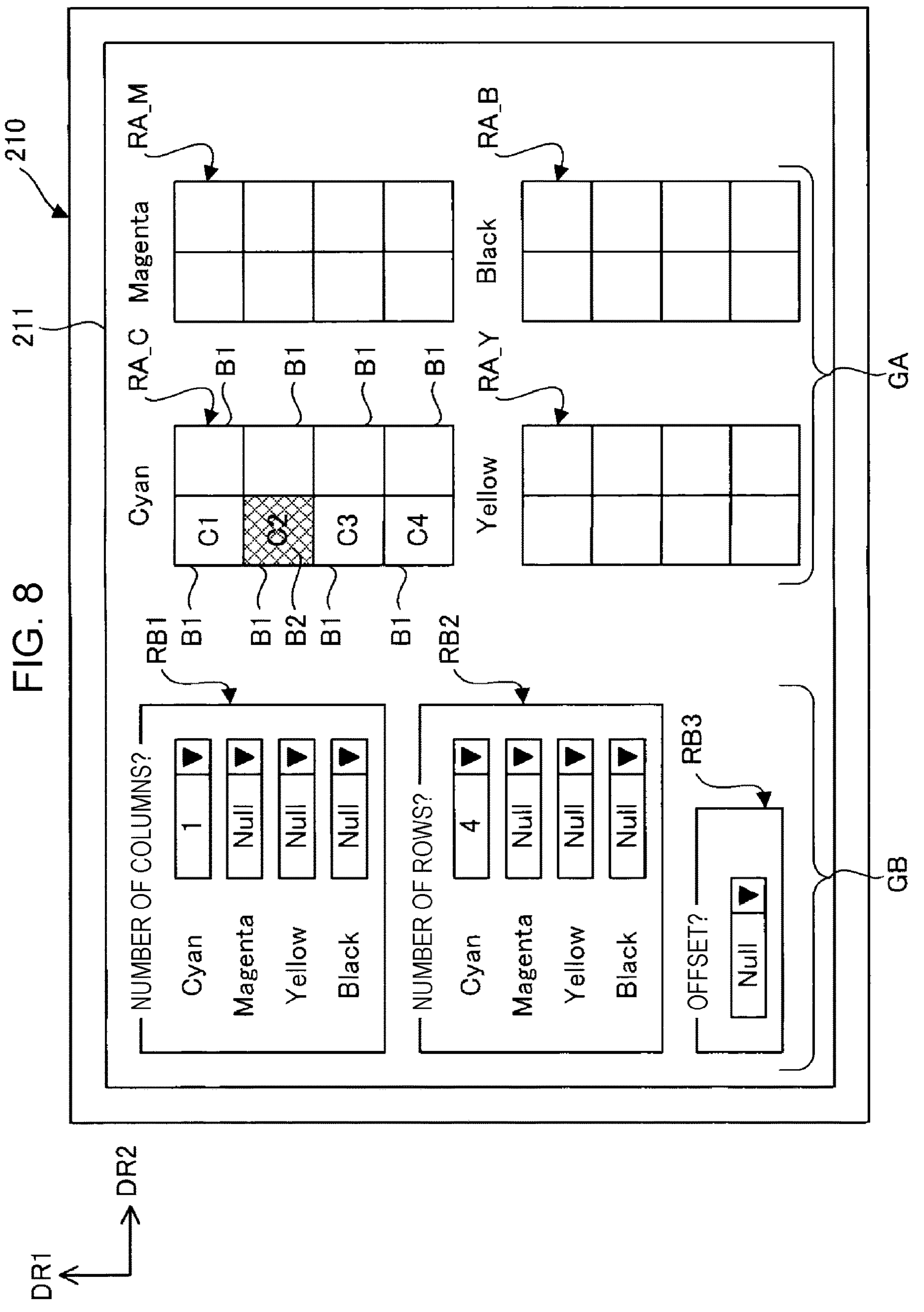
FIG. 8 is a diagram showing an example in which an arrangement image showing Arrangement Example 1 is displayed in a display region.

FIG. 8 is a diagram showing an example in which the arrangement image GA showing Arrangement Example 1 is displayed in the display region 211. In the example shown in FIG. 8, a reception image GB is displayed in the display region 211 in addition to the arrangement image GA.

The reception image GB is a GUI image for receiving an input of information required to generate the arrangement information D3 by operating the input device 220 by the user. The second receiving portion 257 generates the arrangement information D3 using the information input using the reception image GB.

The reception image GB includes regions RB1, RB2, and RB3. The region RB1 is a region for inputting the number of columns of the plurality of liquid ejecting heads 110*a* for each ink color. The region RB2 is a region for inputting the number of rows of the plurality of liquid ejecting heads 110*a* for each ink color. The region RB3 is a region for inputting the presence or absence of an offset. The offset will be described later with reference to FIG. 10.

In the example shown in FIG. 8, each of the regions RB1, RB2, and RB3 is a drop-down list. FIG. 8 shows a state in which information indicating Arrangement Example 1 is input to the regions RB1, RB2, and RB3. Here, in the region RB1, "1" indicating that the liquid ejecting heads 110*a* for cyan ink are in one column is input, and "Null" indicating that liquid ejecting heads 110*a* for inks of other colors do not exist is input. In the region RB2, "4" indicating that the liquid ejecting heads 110*a* for cyan ink are in four rows is input, and "Null" indicating that liquid ejecting heads 110*a* for inks of other colors do not exist is input. In the region RB3, "Null" indicating that the offset does not exist is input.

For each of the regions RB1, RB2, and RB3, any region is possible as long as it can receive necessary information, and the mode is not limited to using the drop-down list and other known widgets can be applied.

The arrangement image GA includes a plurality of head display regions B1. The plurality of head display regions B1 are divided for each ink color.

Specifically, the plurality of head display regions B1 is divided into a cyan head region RA_C indicating the arrangement of a plurality of liquid ejecting heads 110*a* that use cyan ink, a magenta head region RA_M indicating the arrangement of a plurality of liquid ejecting heads 110*a* that use magenta ink, a yellow head region RA_Y indicating the arrangement of a plurality of liquid ejecting heads 110*a* that use yellow ink, and a black head region RA_B indicating the arrangement of a plurality of liquid ejecting heads 110*a* that uses black ink.

In the example shown in FIG. 8, each of the cyan head regions RA_C, the magenta head region RA_M, the yellow head region RA_Y, and the black head region RA_B includes eight head display regions B1 having 4 rows and 2 columns. The number of rows and the number of columns of the head display regions B1 constituting each of the cyan head region RA_C, the magenta head region RA_M, the yellow head region RA_Y, and the black head region RA_B are not limited to the example shown in FIG. 8, and there may be any numbers of rows and columns.

The plurality of head display regions B1 have display modes varied depending on the arrangement of the plurality of liquid ejecting heads 110*a*. Here, the display mode of each of the plurality of head display regions B1 can be varied depending on the color, the presence or absence of characters, and the like. In FIG. 8, the cyan head region RA_C is displayed in a mode showing Arrangement Example 1. In the example shown in FIG. 8, among the eight head display regions B1 constituting the cyan head region RA_C, four head display regions B1 according to Arrangement Example 1 are displayed in a manner different from the other four head display regions B1. More specifically, among the eight head display regions B1 constituting the cyan head region RA_C, characters "C1", "C2", "C3", and "C4" are displayed in the head display regions B1 corresponding to the arrangement of the liquid ejecting heads 110*a*.

Here, the plurality of head display regions B1 corresponding to the liquid ejecting heads 110*a*_C1, 110*a*_C2, 110*a*_C3, and 110*a*_C4 arranged in the Y1 direction are displayed side by side in a direction DR1 corresponding to the Y1 direction. As described above, by varying the position and the number of the head display regions B1 indicating the existence of the liquid ejecting heads 110*a* depending on the arrangement of the liquid ejecting heads 110*a*, the arrangement of the plurality of liquid ejecting heads 110*a* is displayed in the arrangement image GA.

In the present embodiment, among the eight head display regions B1 constituting the cyan head region RA_C, the head display region B1 corresponding to the liquid ejecting head 110*a*_C2 exhibits an error image B2 indicating an error state. In the example shown in FIG. 8, the error image B2 is displayed in a color different from that of the other head display regions B1. The error image B2 may vary in the display mode in, for example, a color and presence or absence of blinking, depending on the content of a property image GC and the like. The error image B2 may be displayed in a region different from the arrangement image GA.

The head display region B1 can receive, from the user, an operation on the head display region B1 indicating that the liquid ejecting head 110*a* exists among the plurality of head display regions B1. The operation is received by the first receiving portion 256. When the first receiving portion 256 receives the operation, the display control portion 255 displays the property information about the target liquid ejecting head 110*a* in the display region 211. An example of the display will be described with reference to FIG. 9.

Figure 9:
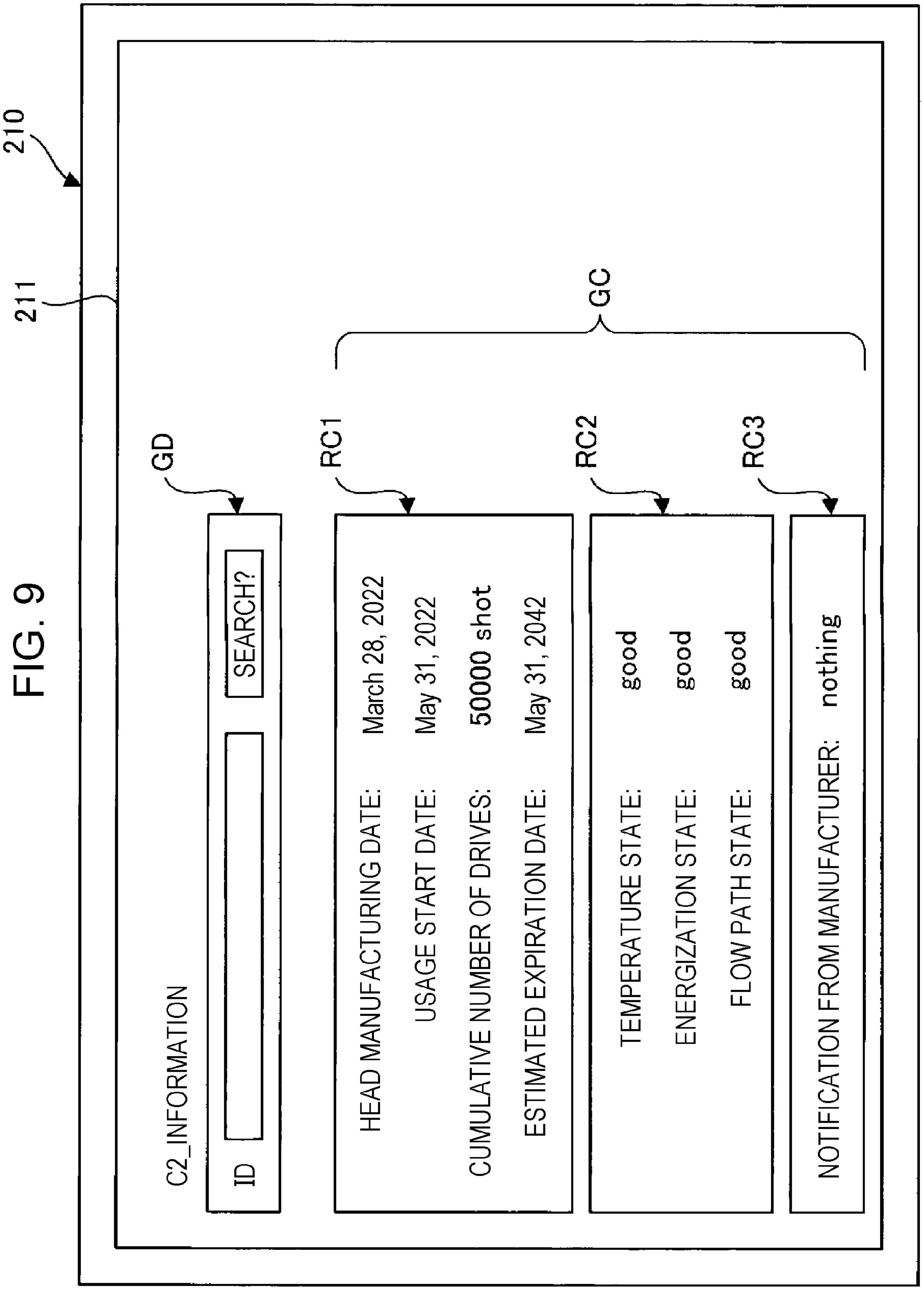
FIG. 9 is a diagram showing an example in which a property image and an input image are displayed in the display region.

FIG. 9 is a diagram showing an example in which the property image GC and the input image GD are displayed in the display region 211. FIG. 9 shows a display of the display region 211 when, among the plurality of head display regions B1, the operation on the head display region B1 corresponding to the liquid ejecting head 110*a*_C2 is received.

The input image GD is an image for a GUI for inputting information required to acquire the unique information D1. In the example illustrated in FIG. 9, the input image GD has a button and a text box. Identification information indicating a unique number such as a serial number of the liquid ejecting head 110*a* is input to the text box. The button is operated after the identification information is input to the text box. In this way, the first processing apparatus 200 requests various information related to the unique information D1 based on the identification information from the external server 300. Then, the external server 300 transmits various information to the first processing apparatus 200. The first processing apparatus 200 acquiring the various information displays the various information as the property image GC. The property image GC includes regions RC1, RC2, and RC3.

Information about the expiration date of the liquid ejecting head 110*a* is displayed in the region RC1. In the example shown in FIG. 9, in the region RC1, items such as a manufacturing date, a usage start date, a cumulative number of drives, and an estimated expiration date are displayed for the liquid ejecting head 110*a* to be operated with respect to the head display region B1. The expiration date is determined by the external server 300, for example, based on one or both of the number of days elapsed from the usage start date, the cumulative number of drives, and the unique information D1. Here, when a certain period of time elapses from a head manufacturing date, the external server 300 may determine that the expiration date is reached regardless of the number of days elapsed from the usage start date and the cumulative number of drives. The item displayed in the region RC1 is not limited to the example shown in FIG. 9, as long as the user can be notified of the expiration date of the liquid ejecting head 110*a*.

The region RC2 indicates the quality of a temperature state, an energization state, and a flow path state of the liquid ejecting head 110*a* to be operated with respect to the head display region B1.

In the region RC3, a notification from the head manufacturer is displayed based on the update information D2. For example, when the liquid ejecting head 110*a* to be operated with respect to the head display region B1 is deficient in the region RC3, display is performed to that effect. Here, when the liquid ejecting head 110*a* to be operated for the head display region B1 is deficient, for example, by displaying “notify” in the region RC3, a notification is issued to the effect that the use of the liquid ejecting head 110*a* to be operated with respect to the head display region B1 is not recommended. In this case, necessary information may be provided to the user later by the head manufacturer or the printer manufacturer in an appropriate method.

Arrangement Example 2

Figure 10:
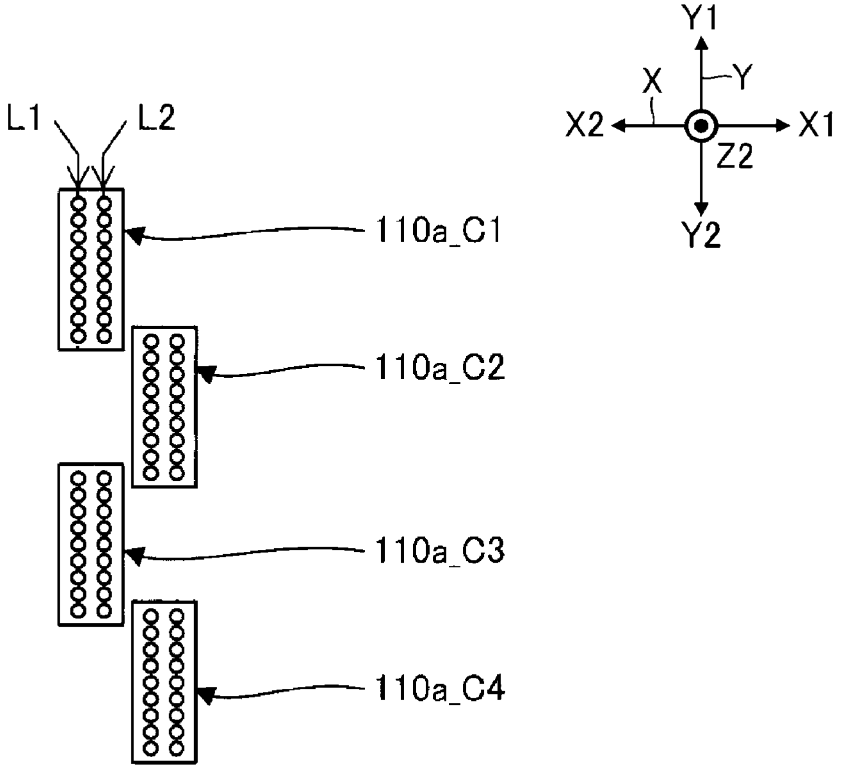
FIG. 10 is a diagram showing Arrangement Example 2 of a plurality of liquid ejecting heads.

FIG. 10 is a diagram showing Arrangement Example 2 of a plurality of liquid ejecting heads. In FIG. 10, as Arrangement Example 2, an arrangement of four liquid ejecting heads 110*a*_C1, 110*a*_C2, 110*a*_C3, and 110*a*_C4 that eject cyan ink is shown.

In Arrangement Example 2, as shown in FIG. 10, the four liquid ejecting heads 110*a*_C1, 110*a*_C2, 110*a*_C3, and 110*a*_C4 are arranged in a staggered manner. Here, the four liquid ejecting heads 110*a*_C1, 110*a*_C2, 110*a*_C3, and 110*a*_C4 are aligned in this order in the Y2 direction. However, the liquid ejecting heads 110*a*_C1 and 110*a*_C3 are aligned along the same straight line along the Y axis so that the positions in the directions along the X axis match. The liquid ejecting heads 110*a*_C2 and 110*a*_C4 are positioned in the X1 direction with respect to the liquid ejecting heads 110*a*_C1 and 110*a*_C3, and are aligned along the same straight line along the Y axis so that the positions in the directions along the X axis match.

Further, ends of the liquid ejecting heads 110*a*_C2 and 110*a*_C4 in the X2 direction are positioned further in the X1 direction with respect to ends of the liquid ejecting heads 110*a*_C1 and 110*a*_C3 in the X1 direction. In addition, an end of the liquid ejecting head 110*a*_C2 in the Y1 direction is positioned further in the Y1 direction with respect to an end of the liquid ejecting head 110*a*_C1 in the Y2 direction. Similarly, an end of the liquid ejecting head 110*a*_C3 in the Y1 direction is positioned further in the Y1 direction with respect to an end of the liquid ejecting head 110*a*_C2 in the Y2 direction. An end of the liquid ejecting head 110*a*_C4 in the Y1 direction is positioned further in the Y1 direction with respect to an end of the liquid ejecting head 110*a*_C3 in the Y2 direction. In this way, “offset” means that the ends of the plurality of liquid ejecting heads 110*a* arranged to be misaligned with each other in the directions along the X axis are arranged to overlap each other in the direction along the Y axis.

Figure 11:
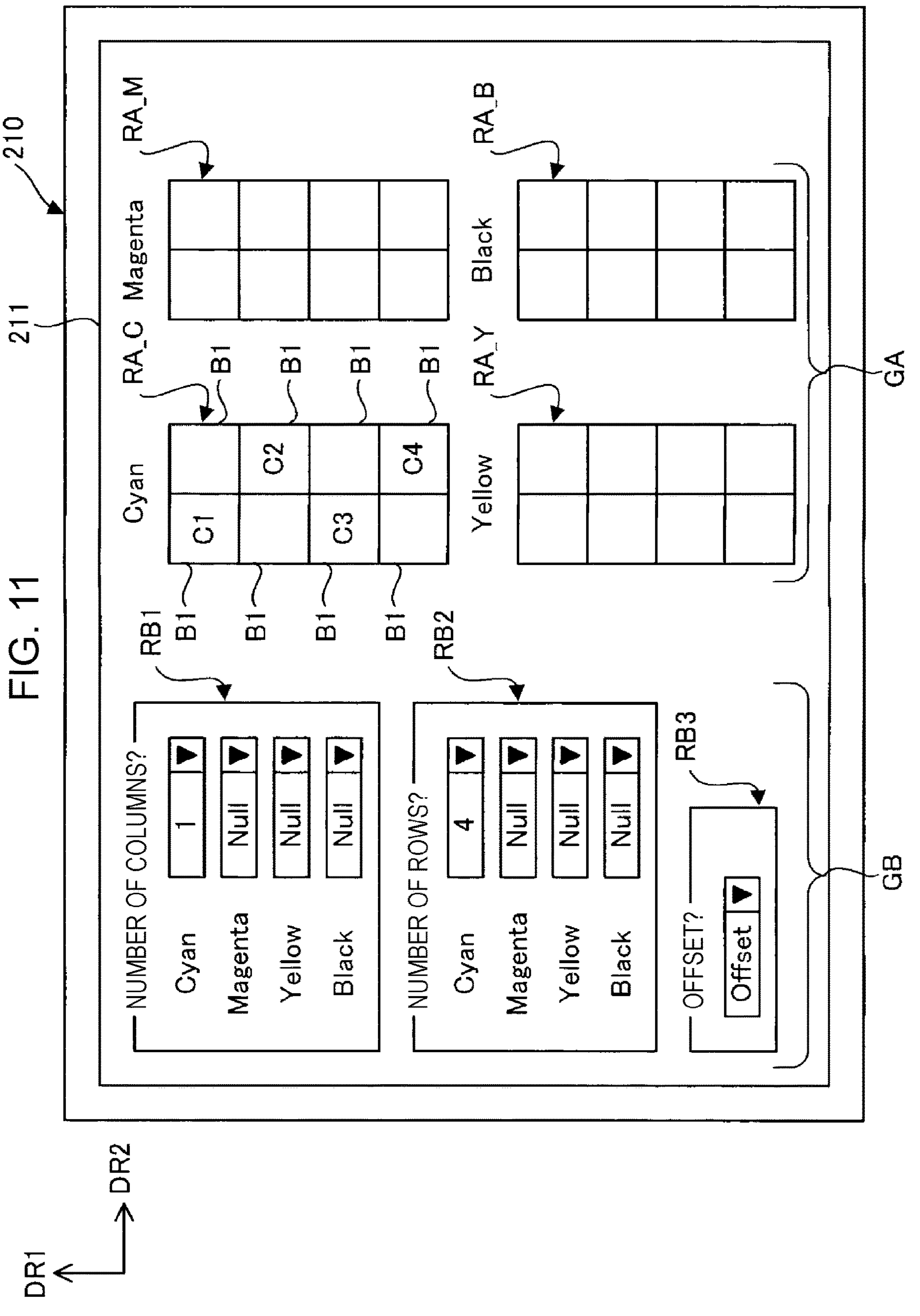
FIG. 11 is a diagram showing an example in which an arrangement image showing Arrangement Example 2 is displayed in the display region.

FIG. 11 is a diagram showing an example in which the arrangement image GA showing Arrangement Example 2 is displayed in the display region 211. The arrangement image GA and the reception image GB shown in FIG. 11 are the same as the arrangement image GA and the reception image GB shown in FIG. 8 above, except that they are applied to Arrangement Example 2.

FIG. 11 shows a state in which information indicating Arrangement Example 2 is input to the regions RB1, RB2, and RB3. Here, in the region RB1, “1” indicating that the liquid ejecting heads 110*a* for cyan ink are in one column is input, and “Null” indicating that liquid ejecting heads 110*a* for inks of other colors do not exist is input. In the region RB2, “4” indicating that the liquid ejecting heads 110*a* for cyan ink are in four rows is input, and “Null” indicating that liquid ejecting heads 110*a* for inks of other colors do not exist is input. In the region RB3, an "Offset" indicating that an offset exists is input.

In FIG. 11, the cyan head region RA_C is displayed in a mode showing Arrangement Example 2. In the example shown in FIG. 11, among the eight head display regions B1 constituting the cyan head region RA_C, four head display regions B1 according to Arrangement Example 2 are displayed in a manner different from the other four head display regions B1. More specifically, among the eight head display regions B1 constituting the cyan head region RA_C, characters "C1", "C2", "C3", and "C4" are displayed in the head display regions B1 corresponding to the arrangement of the liquid ejecting heads 110*a*.

Here, the plurality of head display regions B1 corresponding to the liquid ejecting heads 110*a*_C1 and 110*a*_C3 arranged in the Y1 direction are displayed side by side in the direction DR1 corresponding to the Y1 direction. Similarly, the plurality of head display regions B1 corresponding to the liquid ejecting heads 110*a*_C2 and 110*a*_C4 arranged in the Y1 direction are displayed side by side in the direction DR1 corresponding to the Y1 direction. In addition, among the liquid ejecting heads 110*a*_C1, 110*a*_C2, 110*a*_C3, and 110*a*_C4, two head display regions B1 corresponding to the two liquid ejecting heads 110*a* arranged to be adjacent to each other in the Y1 direction and to be misaligned with each other in the X1 direction are displayed to be adjacent to each other in the direction DR1 corresponding to the Y1 direction and to be misaligned with each other in a direction DR2 corresponding to the X1 direction.

Arrangement Example 3

Figure 12:
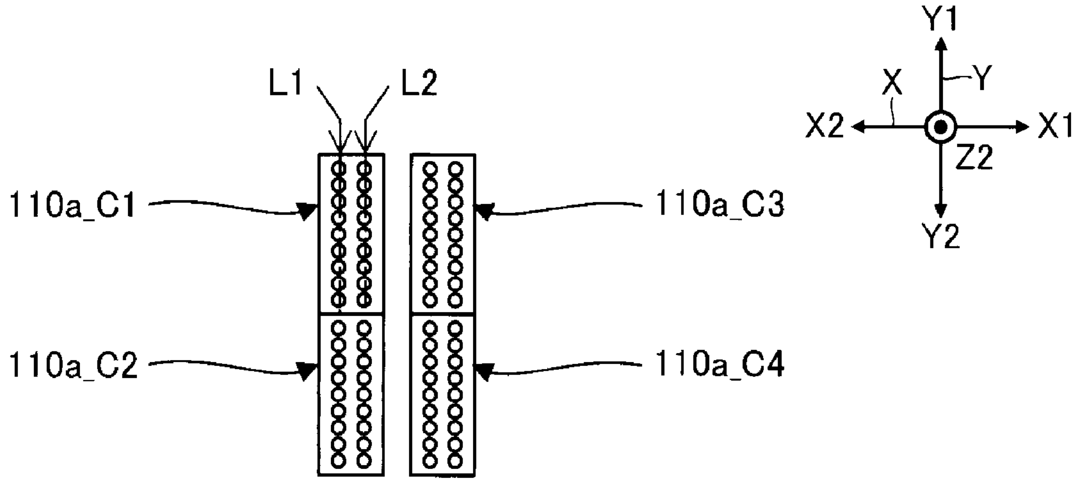
FIG. 12 is a diagram showing Arrangement Example 3 of a plurality of liquid ejecting heads.

FIG. 12 is a diagram showing Arrangement Example 3 of the plurality of liquid ejecting heads 110*a*. In FIG. 12, as Arrangement Example 3, an arrangement of four liquid ejecting heads 110*a*_C1, 110*a*_C2, 110*a*_C3, and 110*a*_C4 that eject cyan ink is shown.

In Arrangement Example 3, as shown in FIG. 12, the four liquid ejecting heads 110*a*_C1, 110*a*_C2, 110*a*_C3, and 110*a*_C4 are arranged in a matrix shape. Here, the liquid ejecting heads 110*a*_C1 and 110*a*_C2 are aligned along the same straight line along the Y axis so that the positions in the directions along the X axis match. The liquid ejecting heads 110*a*_C3 and 110*a*_C4 are positioned in the X1 direction with respect to the liquid ejecting heads 110*a*_C1 and 110*a*_C2, and are aligned along the same straight line along the Y axis so that the positions in the directions along the X axis match.

Further, the liquid ejecting heads 110*a*_C1 and 110*a*_C3 are arranged on the same straight line along the X axis so that both ends thereof in the directions along the Y axis are aligned with each other. Similarly, the liquid ejecting heads 110*a*_C2 and 110*a*_C4 are arranged on the same straight line along the X axis so that both ends thereof in the directions along the Y axis are aligned with each other.

Figure 13:
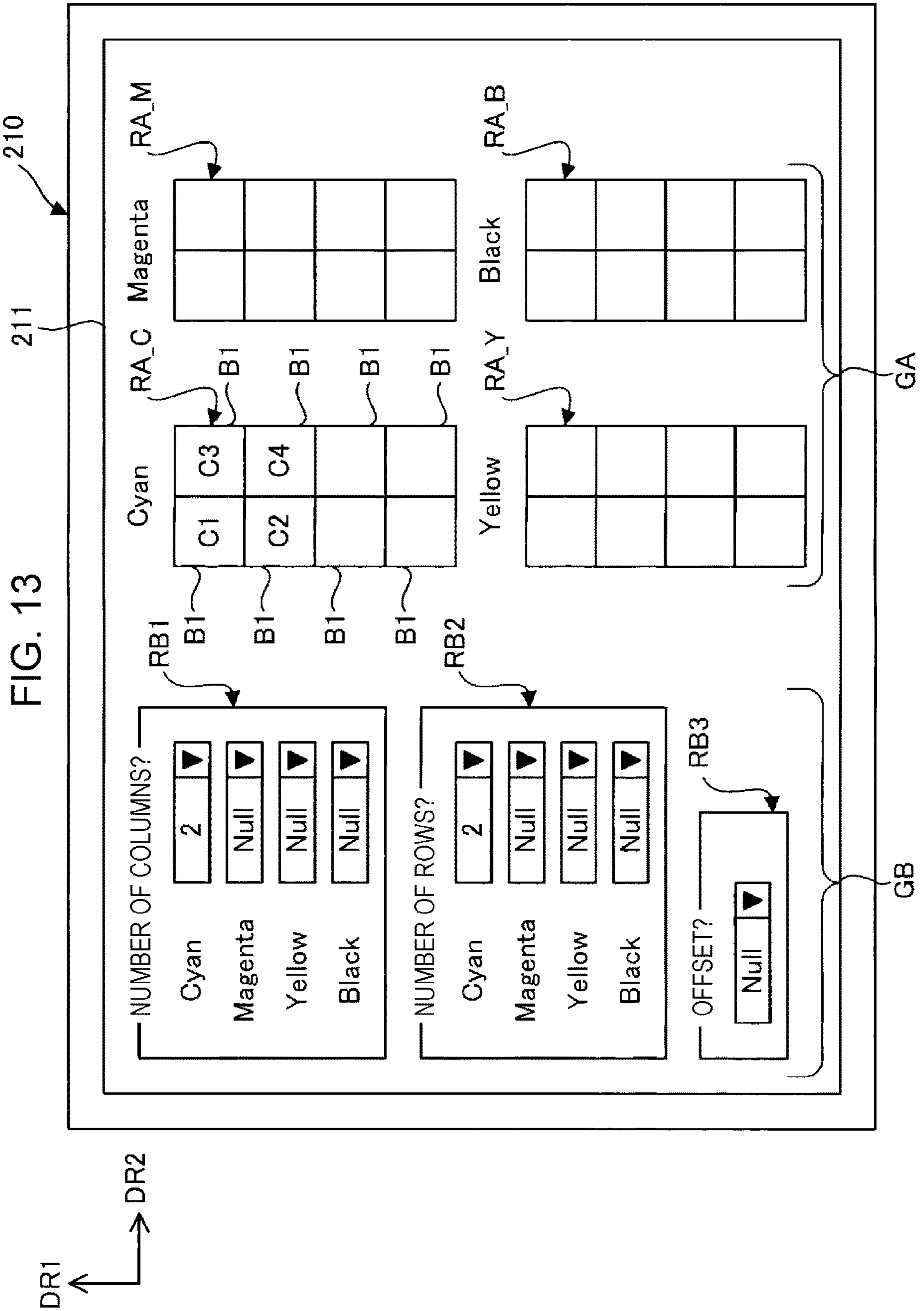
FIG. 13 is a diagram showing an example in which an arrangement image showing Arrangement Example 3 is displayed in the display region.

FIG. 13 is a diagram showing an example in which the arrangement image GA showing Arrangement Example 3 is displayed in the display region 211. The arrangement image GA and the reception image GB shown in FIG. 13 are the same as the arrangement image GA and the reception image GB shown in FIG. 8 above, except that they are applied to Arrangement Example 3.

FIG. 13 shows a state in which information indicating Arrangement Example 3 is input to the regions RB1, RB2, and RB3. Here, in the region RB1, "2" indicating that the liquid ejecting heads 110*a* for cyan ink are in two columns is input, and "Null" indicating that liquid ejecting heads 110*a* for inks of other colors do not exist is input. In the region RB2, "2" indicating that the liquid ejecting heads 110*a* for cyan ink are in two rows is input, and "Null" indicating that liquid ejecting heads 110*a* for inks of other colors do not exist is input. In the region RB3, "Null" indicating that the offset does not exist is input.

In FIG. 13, the cyan head region RA_C is displayed in a mode showing Arrangement Example 3. In the example shown in FIG. 13, among the eight head display regions B1 constituting the cyan head region RA_C, four head display regions B1 according to Arrangement Example 3 are displayed in a manner different from the other four head display regions B1. More specifically, among the eight head display regions B1 constituting the cyan head region RA_C, characters "C1", "C2", "C3", and "C4" are displayed in the head display regions B1 corresponding to the arrangement of the liquid ejecting heads 110*a*.

Here, the plurality of head display regions B1 corresponding to the liquid ejecting heads 110*a*_C1 and 110*a*_C2 arranged in the Y1 direction are displayed side by side in the direction DR1 corresponding to the Y1 direction. Similarly, the plurality of head display regions B1 corresponding to the liquid ejecting heads 110*a*_C3 and 110*a*_C4 arranged in the Y1 direction are displayed side by side in the direction DR1 corresponding to the Y1 direction. Further, the plurality of head display regions B1 corresponding to the liquid ejecting heads 110*a*_C1 and 110*a*_C3 arranged in the X1 direction are displayed side by side in the direction DR2 corresponding to the X1 direction. Similarly, the plurality of head display regions B1 corresponding to the liquid ejecting heads 110*a*_C2 and 110*a*_C4 arranged in the X1 direction are displayed side by side in the direction DR2 corresponding to the X1 direction.

Arrangement Example 4

Figure 14:
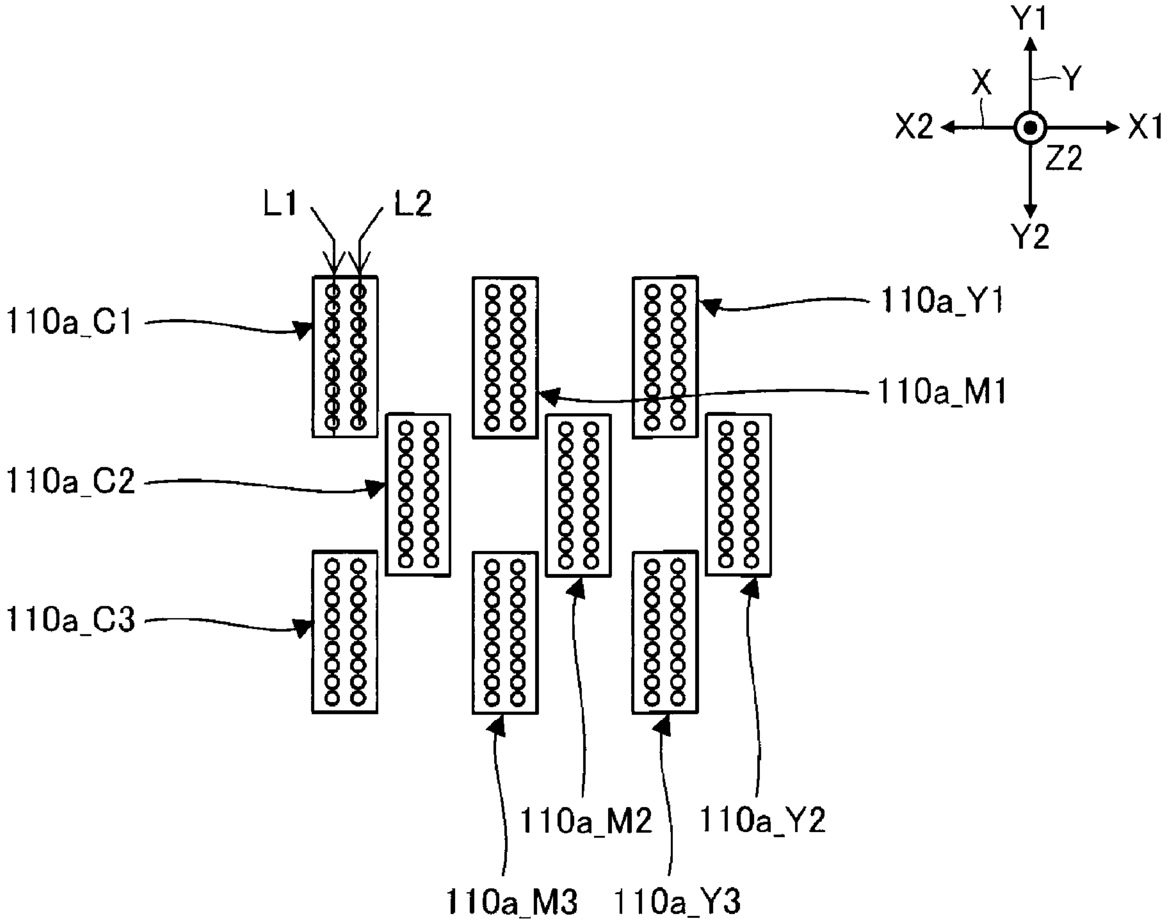
FIG. 14 is a diagram showing Arrangement Example 4 of a plurality of liquid ejecting heads.

FIG. 14 is a diagram showing Arrangement Example 4 of the plurality of liquid ejecting heads 110*a*. In FIG. 14, as Arrangement Example 4, an arrangement of three liquid ejecting heads 110*a*_C1, 110*a*_C2, and 110*a*_C3, three liquid ejecting heads 110*a*_M1, 110*a*_M2, and 110*a*_M3, and three liquid ejecting heads 110*a*_Y1, 110*a*_Y2, and 110*a*_Y3 is shown. Each of the three liquid ejecting heads 110*a*_C1, 110*a*_C2, and 110*a*_C3 is the liquid ejecting head 110*a* that ejects cyan ink. Each of the three liquid ejecting heads 110*a*_M1, 110*a*_M2, and 110*a*_M3 is the liquid ejecting head 110*a* that ejects magenta ink. Each of the three liquid ejecting heads 110*a*_Y1, 110*a*_Y2, and 110*a*_Y3 is the liquid ejecting head 110*a* that ejects yellow ink.

In Arrangement Example 4, as shown in FIG. 14, the three liquid ejecting heads 110*a*_C1, 110*a*_C2, and 110*a*_C3 are arranged in a staggered manner, the three liquid ejecting heads 110*a*_M1, 110*a*_M2, and 110*a*_M3 are arranged in a staggered manner, and the three liquid ejecting heads 110*a*_Y1, 110*a*_Y2, and 110*a*_Y3 are arranged in a staggered manner.

Here, the three liquid ejecting heads 110*a*_C1, 110*a*_C2, and 110*a*_C3 are arranged in the same manner as the aforementioned Arrangement Example 2 shown in FIG. 10 except that the liquid ejecting heads 110*a*_C4 are omitted. Each of the arrangement of the three liquid ejecting heads 110*a*_M1, 110*a*_M2, and 110*a*_M3 and the arrangement of the three liquid ejecting heads 110*a*_Y1, 110*a*_Y2, and 110*a*_Y3 is the same as the arrangement of the three liquid ejecting heads 110*a*_C1, 110*a*_C2, and 110*a*_C3.

Figure 15:
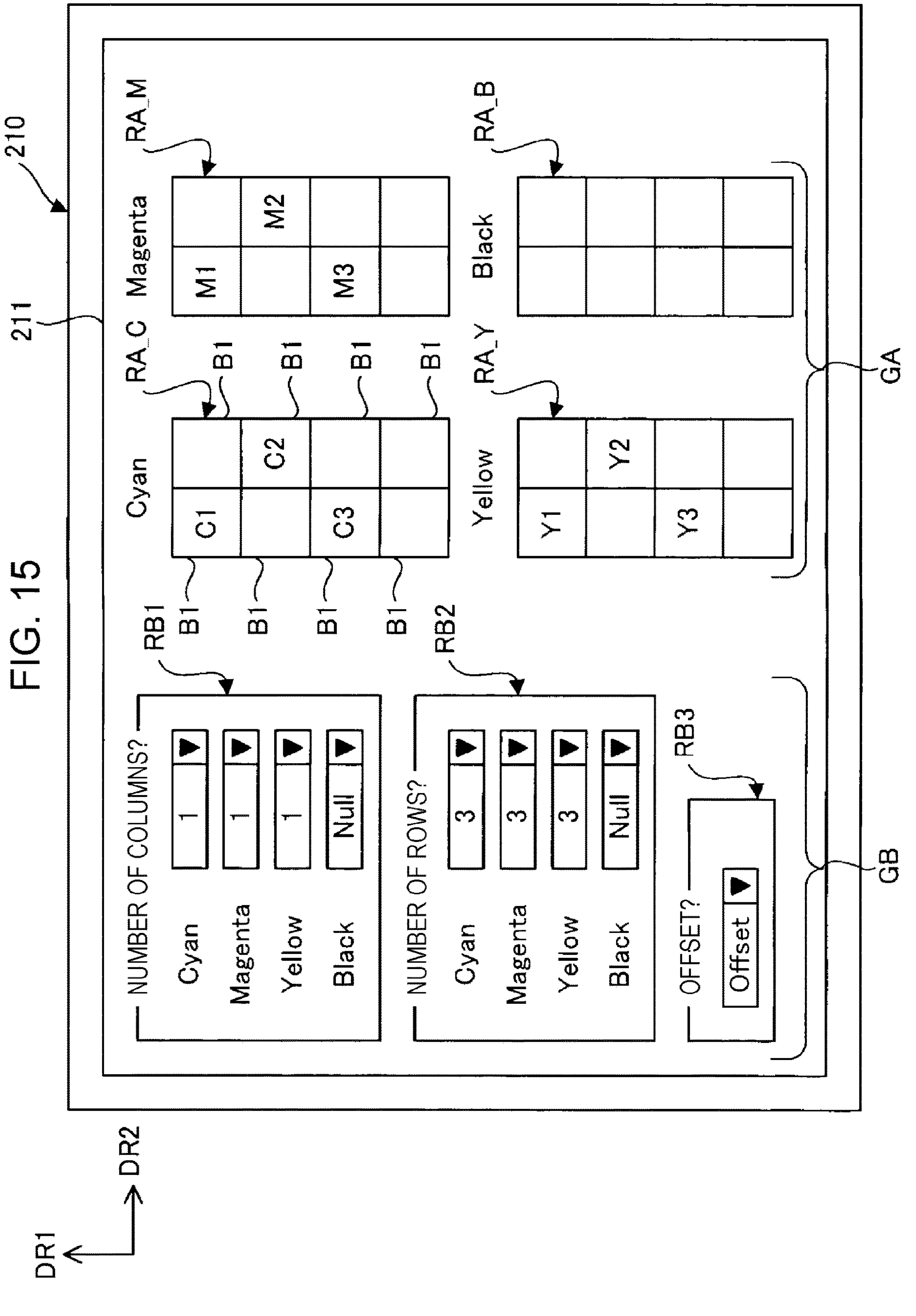
FIG. 15 is a diagram showing an example in which an arrangement image showing Arrangement Example 4 is displayed in the display region.

FIG. 15 is a diagram showing an example in which the arrangement image GA showing Arrangement Example 4 is displayed in the display region 211. The arrangement image GA and the reception image GB shown in FIG. 15 are the same as the arrangement image GA and the reception image GB shown in FIG. 8 above, except that they are applied to Arrangement Example 4.

FIG. 15 shows a state in which information indicating Arrangement Example 4 is input to the regions RB1, RB2, and RB3. Here, in the region RB1, "1" indicating that the liquid ejecting heads 110*a* for each of cyan ink, magenta ink, and yellow ink are in one column is input, and "Null" indicating that liquid ejecting heads 110*a* for black ink do not exist is input. In the region RB2, "3" indicating that the liquid ejecting heads 110*a* for each of cyan ink, magenta ink, and yellow ink are in three rows is input, and "Null" indicating that liquid ejecting heads 110*a* for black ink do not exist is input. In the region RB3, an "Offset" indicating that an offset exists is input.

In FIG. 15, the cyan head region RA_C is displayed in a mode showing Arrangement Example 4. In the example shown in FIG. 15, among the eight head display regions B1 constituting the cyan head region RA_C, three head display regions B1 according to Arrangement Example 4 are displayed in a manner different from the other five head display regions B1. More specifically, among the eight head display regions B1 constituting the cyan head region RA_C, characters "C1", "C2", and "C3" are displayed in the head display regions B1 corresponding to the arrangement of the liquid ejecting heads 110*a*. Similarly, among the eight head display regions B1 constituting the magenta head region RA_M, three head display regions B1 according to Arrangement Example 4 are displayed in a manner different from the other five head display regions B1. Among the eight head display regions B1 constituting the yellow head region RA_Y, three head display regions B1 according to Arrangement Example 4 are displayed in a manner different from the other five head display regions B1.

As described above, the liquid ejecting system 10 includes the head units 110, the first output portion 252, the first input portion 253, and the notification portion 254. The head units 110 eject ink, which is an example of "liquid". The first output portion 252 outputs the unique information D1 unique to head unit 110 to the external server 300. The update information D2 for the head unit 110 is input from the external server 300 to the first input portion 253 in association with the unique information D1. The notification portion 254 notifies the user based on the update information D2.

In the liquid ejecting system 10, the first output portion 252 outputs the unique information D1 to the external server 300, and thus the external server 300 can generate the update information D2 based on the unique information D1. The update information D2 is input from the external server 300 to the first input portion 253, the notification portion 254 performs the notification based on the update information D2, and thus the update information D2 is provided to the user. As described above, even when the printer manufacturer is different from the head manufacturer, the update information D2 about the head unit 110 can be promptly provided to the user.

As described above, the update information D2 includes the deficiency notification information D2*a* for notifying the user of the deficiency of the head unit 110. Therefore, the user can be promptly notified of the deficiency of the head unit 110.

Further, as described above, the head unit 110 includes the storage circuit 116, which is an example of a "storage portion". The storage circuit 116 stores the program PG0 used for ejecting ink. The update information D2 includes the update information D2*b* for updating the program PG0. Therefore, the update information D2*b* can be promptly provided to the user.

In the present embodiment, as described above, the liquid ejecting system 10 includes the liquid ejecting apparatus 100 including head units 110, the first processing apparatus 200 that generates the recorded data DP used in the liquid ejecting apparatus 100, and the external server 300.

Here, as described above, each of the first output portion 252, the first input portion 253, and notification portion 254 is provided in first processing apparatus 200. Therefore, the first processing apparatus 200 can perform the display based on the update information D2.

Further, as described above, the external server 300 stores correspondence information D4 regarding the correspondence relationship between the unique information D1 and the update information D2. Therefore, the external server 300 can generate the update information D2 using the correspondence information D4.

2. Second Embodiment

Hereinafter, a second embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 16:
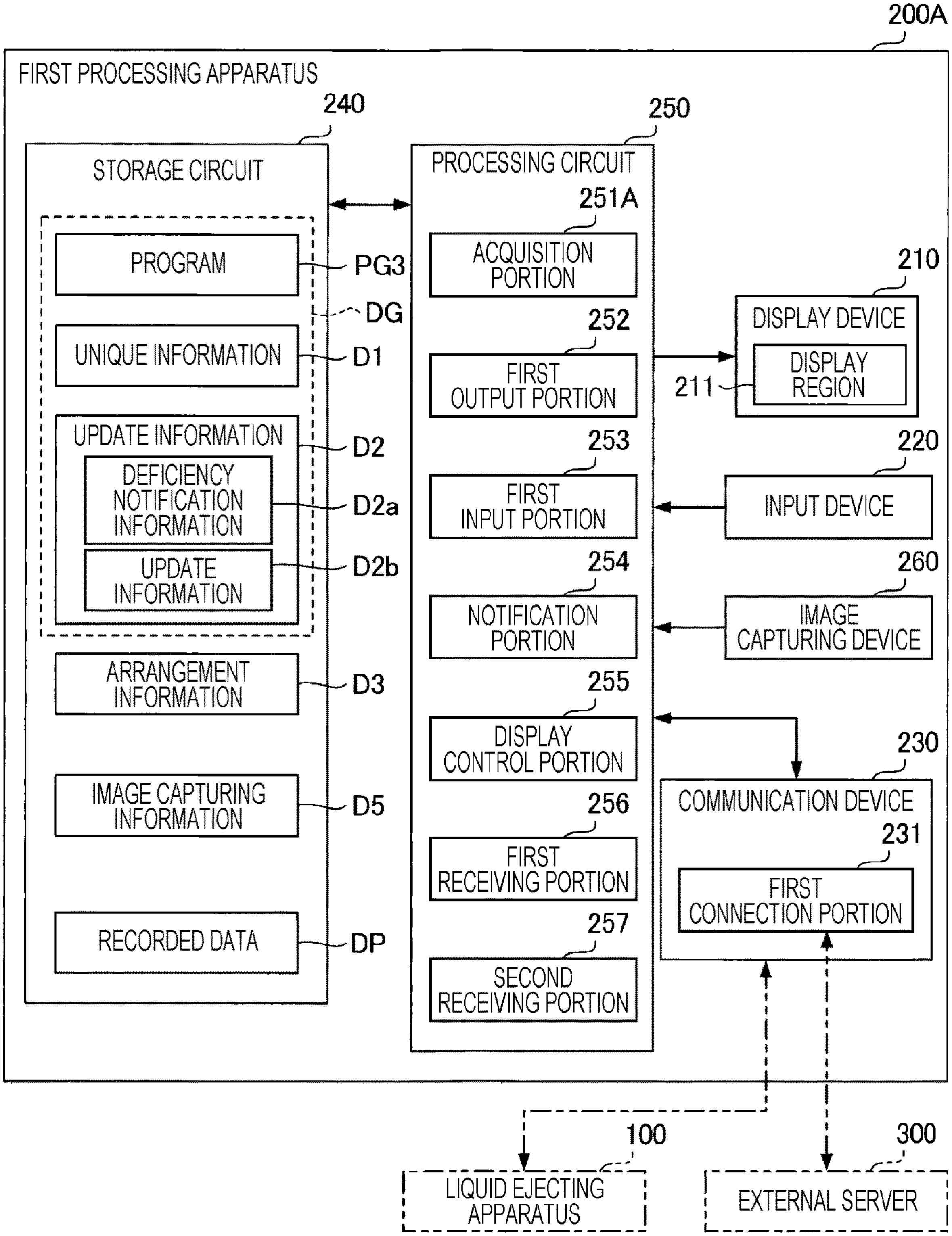
FIG. 16 is a schematic diagram showing a configuration example of a first processing apparatus according to a second embodiment.

FIG. 16 is a schematic diagram showing a configuration example of a first processing apparatus 200A in the second embodiment. The present embodiment is the same as the above-described first embodiment except that the first processing apparatus 200A is used instead of the first processing apparatus 200. The first processing apparatus 200A has the same configuration as the first processing apparatus 200 except that a program PG3 is used instead of the program PG1 and an image capturing device 260 is added. The program PG3 is the same as the program PG1 except that the program PG3 can cause a computer to execute a process of acquiring the unique information D1 using the image capturing device 260.

The image capturing device 260 is a device having an image capturing element such as a CCD image sensor or a CMOS image sensor that captures an image of a plurality of liquid ejecting heads 110*a*. For example, the image capturing device 260 is disposed at a position facing the plurality of liquid ejecting heads 110*a*. The image capturing device 260 generates image capturing information D5 indicating images obtained by imaging the plurality of liquid ejecting heads 110*a*. The image capturing information D5 is stored in the storage circuit 240. In addition to the image capturing element, the image capturing device 260 may include an optical system such as a lens, as needed.

The processing circuit 250 functions as an acquisition portion 251A, a first output portion 252, a first input portion 253, a notification portion 254, a display control portion 255, a first receiving portion 256, and a second receiving portion 257 by reading the program PG3 from the storage circuit 240 and executing the program PG3.

The acquisition portion 251A acquires the arrangement information D3 in addition to the unique information D1. Here, the acquisition portion 251A acquires the arrangement information D3 based on the image capturing information D5. For example, the acquisition portion 251A recognizes the arrangement of a plurality of liquid ejecting heads 110*a* by image processing for performing object recognition on the liquid ejecting heads 110*a* from the image indicated by the image capturing information D5, and generates the arrangement information D3 based on the recognition result.

As in the above-described first embodiment, in the above-described second embodiment, the update information D2 about the head unit 110 can be promptly provided to the user.

3. Third Embodiment

Hereinafter, a third embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 17:
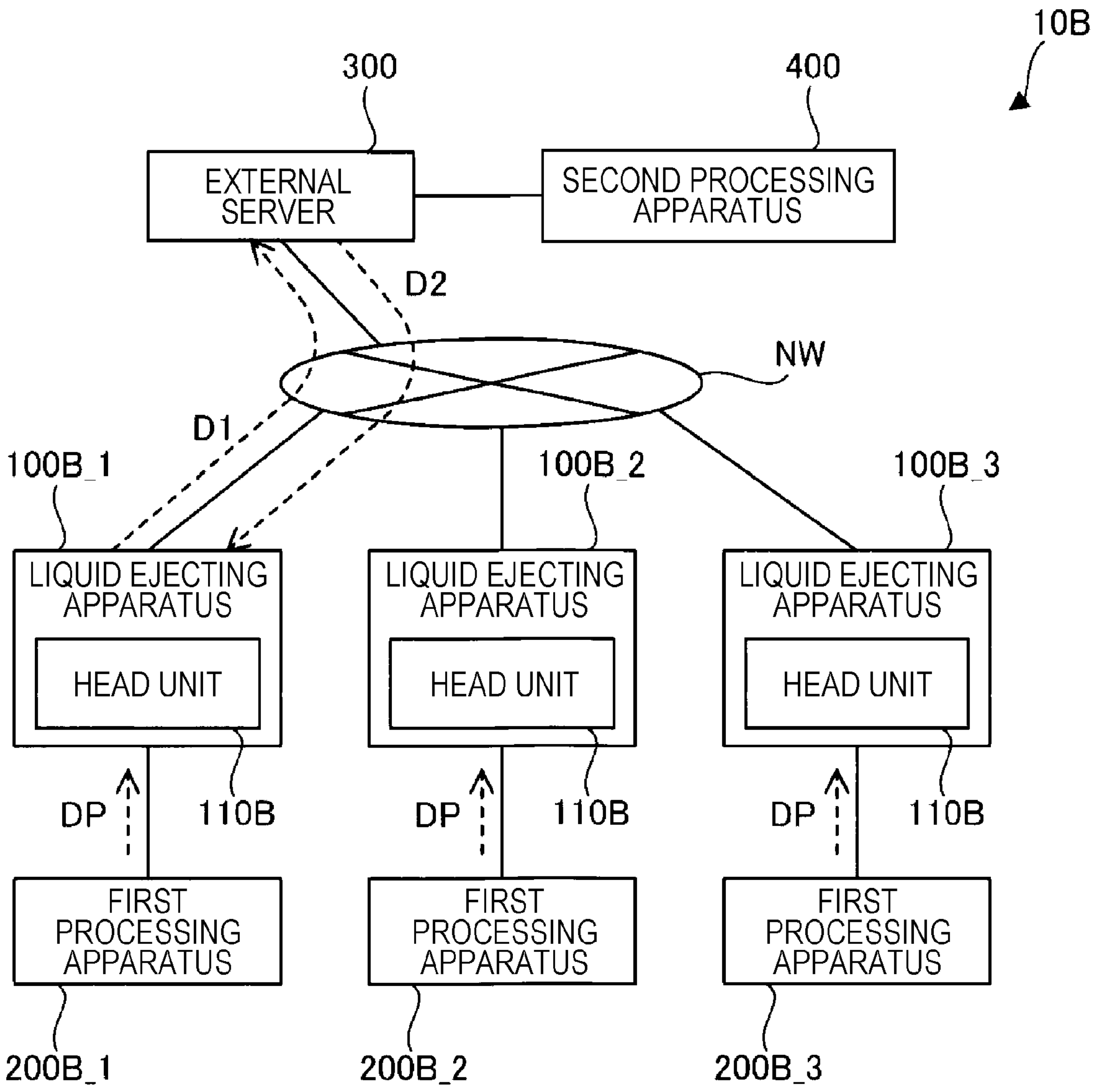
FIG. 17 is a schematic diagram showing a configuration example of a liquid ejecting system according to a third embodiment.

FIG. 17 is a schematic diagram showing a configuration example of a liquid ejecting system 10B according to the third embodiment. The liquid ejecting system 10B has the same configuration as the liquid ejecting system 10 of the above-described first embodiment except that liquid ejecting apparatuses 100B_1 to 100B_3 and first processing apparatuses 200B_1 to 200B_3 are provided in place of the liquid ejecting apparatuses 100_1 to 100_3 and the first processing apparatuses 200_1 to 200_3.

The liquid ejecting apparatus 100B_1 is communicably connected to the first processing apparatus 200B_1 and is communicably connected to the external server 300 through the communication network NW. The liquid ejecting apparatus 100B_2 is communicably connected to the first processing apparatus 200B_2 and is communicably connected to the external server 300 through the communication network NW. The liquid ejecting apparatus 100B_3 is communicably connected to the first processing apparatus 200B_3 and is communicably connected to the external server 300 through the communication network NW. As described above, the liquid ejecting apparatuses 100B_1 to 100B_3 correspond to the first processing apparatuses 200B_1 to 200B_3, respectively, and are communicably connected to the first processing apparatuses 200B_1 to 200B_3 and are communicably connected to the external server 300 through the communication network NW. In the following, without distinguishing each of the liquid ejecting apparatuses 100B_1 to 100B_3 from the others, they may be referred to as the liquid ejecting apparatus 100B. Without distinguishing each of the first processing apparatuses 200B_1 to 200B_3 from the others, they may be referred to as the first processing apparatus 200B.

In the example shown in FIG. 17, the number of each of the liquid ejecting apparatus 100B and the first processing apparatus 200B included in the liquid ejecting system 10B is three, but the number is not limited thereto, and the number may be one, two, or four or more. That is, the number of the sets of the liquid ejecting apparatus 100B and the first processing apparatus 200B is not limited to three, and may be one, two, or four or more.

The liquid ejecting apparatus 100B is configured in the same manner as the liquid ejecting apparatus 100 of the first embodiment described above, except that a head unit 110B is provided in place of the head unit 110. The head unit 110B is the same as the head unit 110 except that functions of acquiring and outputting the unique information D1 and inputting and giving a notification of the update information D2 are added. Details of the liquid ejecting apparatus 100B will be described later with reference to FIG. 18.

The liquid ejecting apparatus 100B outputs unique information D1 to the external server 300 and inputs update information D2 from the external server 300. Then, the liquid ejecting apparatus 100B makes the notification based on the update information D2.

The first processing apparatus 200B is configured in the same manner as the first processing apparatus 200 of the first embodiment described above, except that the functions of acquiring and outputting the unique information D1 and inputting and giving the notification of the update information D2 are omitted.

Figure 18:
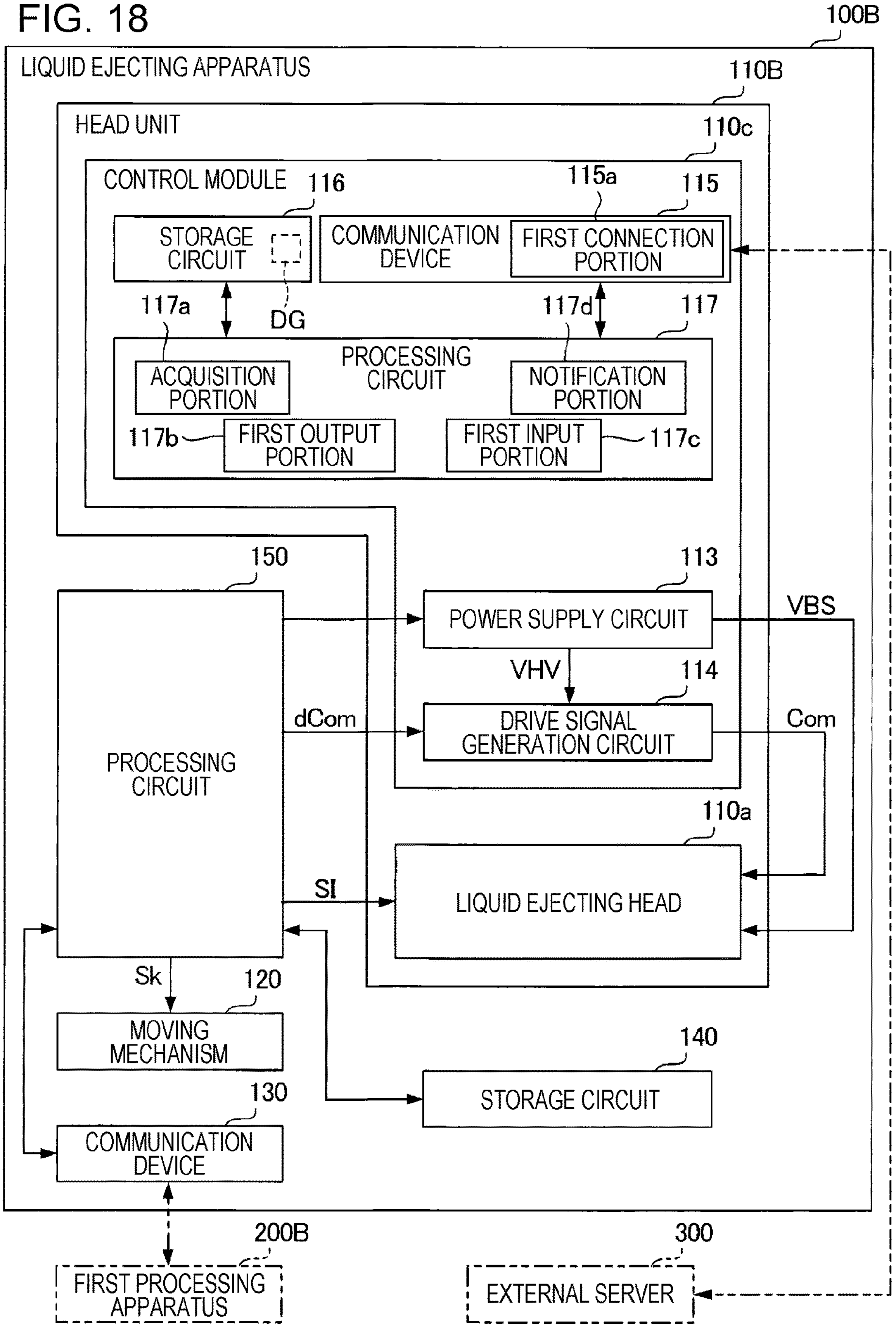
FIG. 18 is a schematic diagram showing a configuration example of a liquid ejecting apparatus used in the liquid ejecting system according to the third embodiment.

FIG. 18 is a schematic diagram showing a configuration example of the liquid ejecting apparatus 100B used in the liquid ejecting system 10B according to the third embodiment. As shown in FIG. 18, the head unit 110B included in the liquid ejecting apparatus 100B is configured in the same manner as the head unit 110 of the first embodiment except that a control module 110*c* is provided in place of the control module 110*b*. The control module 110*c* is configured in the same manner as the control module 110*b* except that the information DG is used and a communication device 115 is added.

The communication device 115 is a circuit capable of communicating with the external server 300. For example, the communication device 115 is an interface such as a wireless or wired LAN or USB. The communication device 115 transmits the unique information D1 and receives the update information D2 by communicating with the external server 300. That is, the communication device 115 functions as a first connection portion 115*a* that is communicably connected to the external server 300, as similar to the first connection portion 231 of the first embodiment.

The storage circuit 116 stores the same information DG as in FIG. 4 described above. That is, the storage circuit 116 stores the program PG1, the unique information D1, and the update information D2. The processing circuit 117 functions as an acquisition portion 117*a*, a first output portion 117*b*, a first input portion 117*c*, and a notification portion 117*d* by reading the program PG1 from the storage circuit 116 and executing the program PG1.

The acquisition portion 117*a* acquires the unique information D1, as similar to the acquisition portion 251 of the first embodiment. The first output portion 117*b* outputs the unique information D1 through the first connection portion 115*a*, as similar to the first output portion 252 of the first embodiment. The update information D2 is input to the first input portion 117*c* through the first connection portion 115*a*, as similar to the first input portion 253 of the first embodiment. The notification portion 117*d* makes a notification based on the update information D2 as similar to the notification portion 254 of the first embodiment. The notification may be made by the display on the display region 211 of the first processing apparatus 200B, by the display on the display device provided in the liquid ejecting apparatus 100B, and so on.

Figure 19:
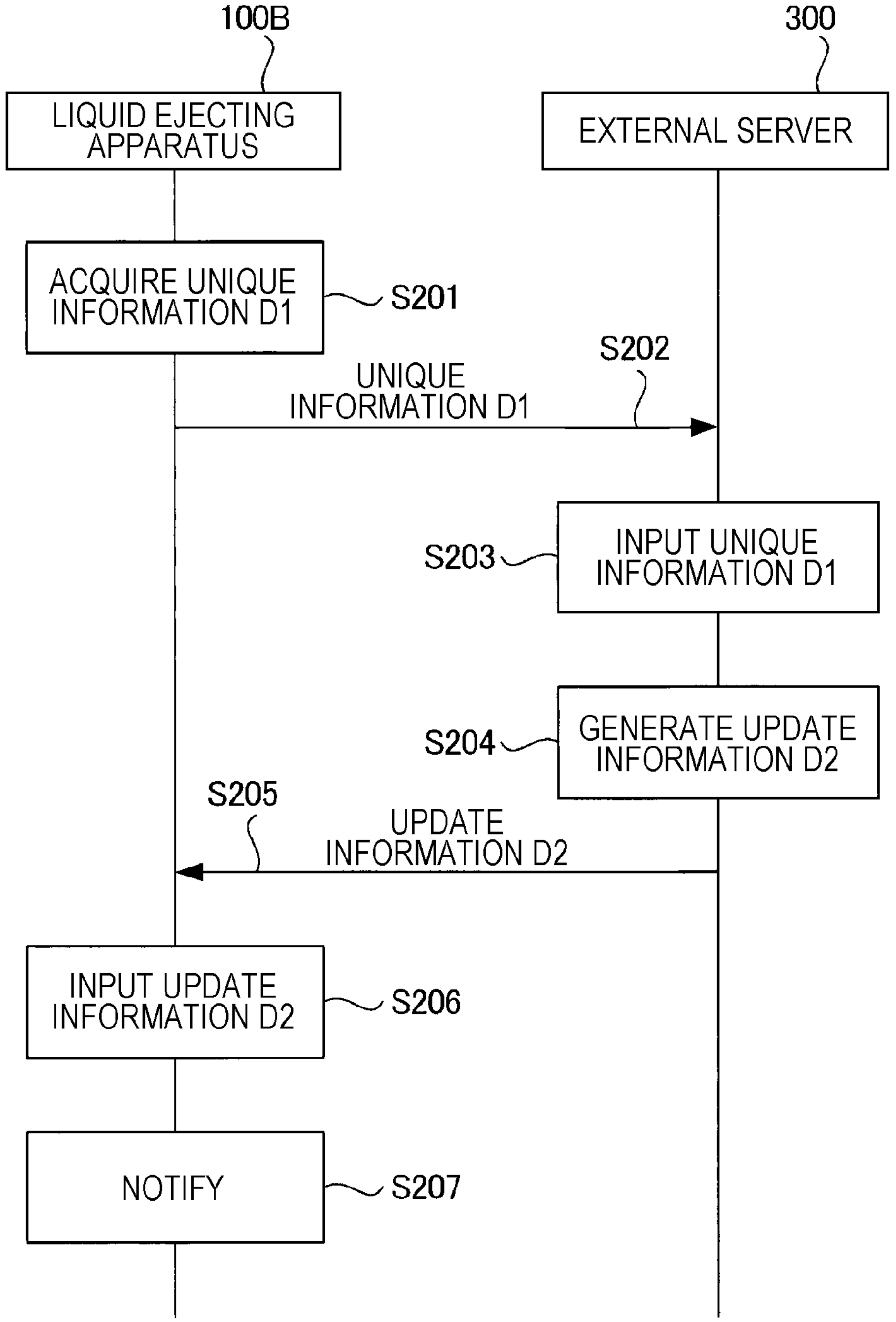
FIG. 19 is a flowchart showing a process of the liquid ejecting system according to the third embodiment.

FIG. 19 is a flowchart showing a process of the liquid ejecting system 10B according to the third embodiment. In the liquid ejecting system 10B, first, as shown in FIG. 19, in step S201, the liquid ejecting apparatus 100B acquires the unique information D1. Then, in step S202, the liquid ejecting apparatus 100B outputs the unique information D1 to the external server 300.

Next, in step S203, the external server 300 inputs the unique information D1. Then, in step S204, the external server 300 generates the update information D2 based on the unique information D1. Then, in step S205, the external server 300 outputs the update information D2 to the liquid ejecting apparatus 100B.

Next, in step S206, the liquid ejecting apparatus 100B inputs the update information D2. Then, in step S207, the liquid ejecting apparatus 100B makes a notification based on the update information D2.

As in the above-described first embodiment, in the above-described third embodiment, the update information D2 about the head unit 110 can be promptly provided to the user. In the present embodiment, as described above, each of the first output portion 117*b*, the first input portion 117*c*, and the notification portion 117*d* is provided in the liquid ejecting apparatus 100B. Therefore, the liquid ejecting apparatus 100B can make the notification based on the update information D2. In addition, the program for notifying is not needed to be incorporated into the first processing apparatus 200B, and thus it is possible to reduce the burden on the printer manufacturer or the user.

4. Fourth Embodiment

Hereinafter, a fourth embodiment of the present disclosure will be described. In the embodiment illustrated below, elements whose actions or functions are similar to those of the first embodiment will be denoted by the same reference numerals used in the description of the first embodiment and detailed description thereof will be omitted as appropriate.

Figure 20:
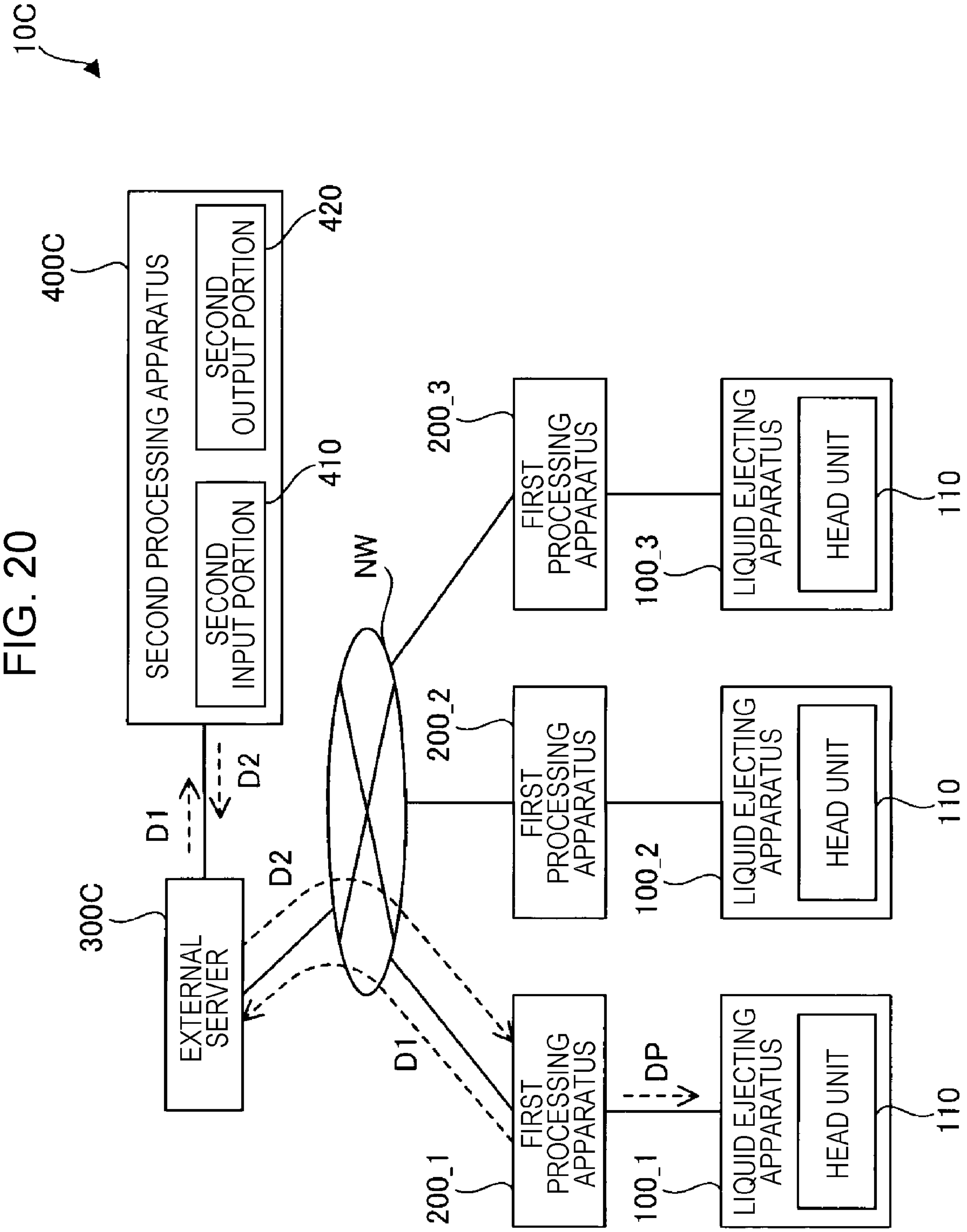
FIG. 20 is a schematic diagram showing a configuration example of a liquid ejecting system according to a fourth embodiment.

FIG. 20 is a schematic diagram showing a configuration example of a liquid ejecting system 10C according to the fourth embodiment. The liquid ejecting system 10C has the same configuration as that of the liquid ejecting system 10 of the first embodiment described above, except that an external server 300C is provided instead of the external server 300 and a second processing apparatus 400C is provided instead of the second processing apparatus 400.

The external server 300C has the same configuration as that of the external server 300 of the first embodiment except that the external server 300C outputs the unique information D1 to the second processing apparatus 400C, receives the input of the update information D2 from the second processing apparatus 400C, and outputs the update information D2 to the first processing apparatus 200.

The second processing apparatus 400C may have the same configuration as that of the second processing apparatus 400 of the first embodiment except that the second processing apparatus 400C includes a second input portion 410 and a second output portion 420 and is capable of generating or inputting the update information D2. The second input portion 410 and the second output portion 420 are implemented by executing a program installed in the second processing apparatus 400C on a processor of the second processing apparatus 400C.

The unique information D1 is input from the external server 300C to the second input portion 410. The second output portion 420 outputs the update information D2 to the external server 300C. The update information D2 to be output is generated in the same manner as in the external server 300 of the first embodiment described above, or is acquired by an operation of an operator of the second processing apparatus 400C based on the input unique information D1.

Figure 21:
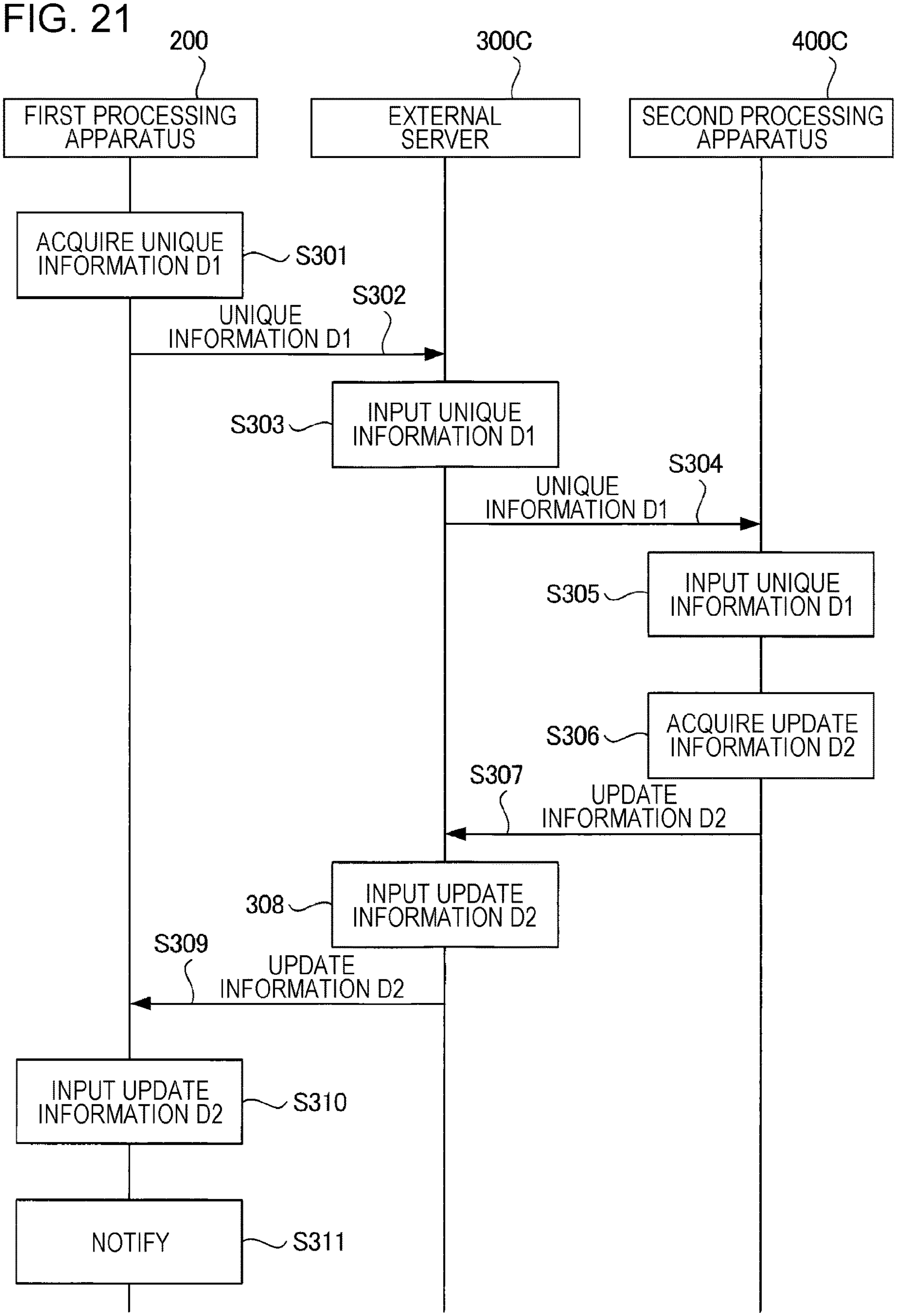
FIG. 21 is a flowchart showing a process of the liquid ejecting system according to the fourth embodiment.

FIG. 21 is a flowchart showing a process of the liquid ejecting system 10C according to the fourth embodiment. In the liquid ejecting system 10C, first, as shown in FIG. 21, in step S301, the first processing apparatus 200 acquires the unique information D1. Then, in step S302, the first processing apparatus 200 outputs the unique information D1 to the external server 300C.

Next, in step S303, the external server 300 inputs the unique information D1. Then, in step S304, the external server 300 outputs the unique information D1 to the second processing apparatus 400C.

Then, in step S305, the second processing apparatus 400C inputs the unique information D1. Then, in step S306, the second processing apparatus 400C acquires the update information D2. Then, in step S307, the second processing apparatus 400C outputs the update information D2 to the external server 300C.

Next, in step S308, the external server 300 inputs the update information D2. Then, in step S309, the external server 300 outputs the update information D2 to the first processing apparatus 200.

Next, in step S310, the first processing apparatus 200 inputs the update information D2. Then, in step S311, the first processing apparatus 200 makes a notification based on the update information D2.

As in the above-described first embodiment, in the above-described third embodiment, the update information D2 about the head unit 110 can be promptly provided to the user. As described above, in the present embodiment, the liquid ejecting system 10C further includes a second processing apparatus 400C different from the first processing apparatus 200. The second processing apparatus 400C includes the second input portion 410 and the second output portion 420. The unique information D1 is input from the external server 300 to the second input portion 410. The second output portion 420 outputs the update information D2 to the external server 300. Therefore, it is possible to generate the update information D2, or to generate and update the correspondence information D4 by the second processing apparatus 400C.

5. Modification Examples

The liquid ejecting system of the present disclosure has been described above based on the illustrated embodiments, but the present disclosure is not limited thereto. Further, the configuration of each portion of the present disclosure can be replaced with any configuration that exhibits the same functions as that of the above-described embodiments, or any configuration can be added.

5-1. Modification Example 1

In the above-described embodiments, the configuration in which the update information D2 includes both the deficiency notification information D2*a* and the update information D2*b* is exemplified; however, in the update information D2, one of the deficiency notification information D2*a* and the update information D2*b* may be omitted, or information other than the deficiency notification information D2*a* and the update information D2*b* may be included.

5-2. Modification Example 2

In the above-described embodiments, the configuration in which the external server 300 is a cloud server is exemplified, but the configuration is not limited thereto. For example, the external server 300 may be a server other than a cloud server or a virtual server, or may be an on-premises server.

5-3. Modification Example 3

In the above-described embodiments, the configuration in which the drive element **111*f* is a piezoelectric element is exemplified, but the configuration is not limited thereto, and for example, the drive element 111*f* may be a heater that heats ink in the pressure chamber C. That is, the drive method of the head chip 111** is not limited to the piezoelectric method, and may be, for example, a thermal method.

What is claimed is:

1. A liquid ejecting system comprising:

a liquid ejecting apparatus;

a head unit that ejects liquid included in the liquid ejecting apparatus;

a first processing apparatus that generates recorded data used in the liquid ejecting apparatus;

a second processing apparatus that is different from the first processing apparatus;

an external server;

a first output portion that outputs unique information unique to the head unit to the external server;

a first input portion to which update information about the head unit is input from the external server in association with the unique information; and a notification portion that notifies a user based on the update information, wherein the second processing apparatus includes a second input portion to which the unique information is input from the external server, and a second output portion that outputs the update information to the external server.

2. The liquid ejecting system according to claim 1, wherein the update information includes deficiency notification information for notifying the user of a deficiency of the head unit.

3. The liquid ejecting system according to claim 1, wherein the head unit includes a storage portion that stores a program used for ejecting liquid, and the update information includes update information for updating the program.

4. The liquid ejecting system according to claim 1, wherein each of the first output portion, the first input portion, and the first notification portion is provided in the liquid ejecting apparatus or the first processing apparatus.

5. The liquid ejecting system according to claim 1, wherein the external server stores correspondence information regarding a correspondence relationship between the unique information and the update information.

* * * * *